US011812337B2

United States Patent
Wiacek

(10) Patent No.: US 11,812,337 B2
(45) Date of Patent: Nov. 7, 2023

(54) POSITION DETERMINATION

(71) Applicant: Nokia Technologies Oy, Espoo (FI)

(72) Inventor: Fabian Wiacek, Warsaw (PL)

(73) Assignee: Nokia Technologies Oy, Espoo (FI)

( * ) Notice: Subject to any disclaimer, the term of this patent is extended or adjusted under 35 U.S.C. 154(b) by 234 days.

(21) Appl. No.: 17/254,370

(22) PCT Filed: Mar. 28, 2019

(86) PCT No.: PCT/EP2019/057901
§ 371 (c)(1),
(2) Date: Dec. 21, 2020

(87) PCT Pub. No.: WO2020/001821
PCT Pub. Date: Jan. 2, 2020

(65) Prior Publication Data
US 2021/0274462 A1 Sep. 2, 2021

(51) Int. Cl.
*H04W 4/029* (2018.01)
*G01S 5/10* (2006.01)
(Continued)

(52) U.S. Cl.
CPC ........... *H04W 4/029* (2018.02); *G01S 5/0236* (2013.01); *G01S 5/0284* (2013.01); *G01S 5/10* (2013.01);
(Continued)

(58) Field of Classification Search
CPC ... H04W 16/28; H04W 56/001; H04W 24/08; H04W 48/16; H04W 74/0833; H04W 74/0841; H04W 16/14; H04W 24/04; H04W 24/10; H04W 36/0085; H04W 4/029; H04W 48/12; H04W 52/0216; H04W 52/0245; H04W 52/0258; H04W 56/005; H04W 64/00; H04W 64/006; H04W 72/0406; H04W 72/0453;
(Continued)

(56) References Cited

U.S. PATENT DOCUMENTS

| 7,359,712 B2 | 4/2008 | Gutowski | .................. 455/456.1 |
| 8,994,591 B2 | 3/2015 | Dupray et al. | ................ 342/450 |

(Continued)

FOREIGN PATENT DOCUMENTS

| EP | 1 688 757 A2 | 8/2006 |
| WO | WO 03/087869 A1 | 10/2003 |

(Continued)

*Primary Examiner* — Joseph Arevalo
(74) *Attorney, Agent, or Firm* — Harrington & Smith

(57) ABSTRACT

An apparatus including at least one processor; and at least one memory including computer program code which, when executed by the at least one processor, causes the apparatus to receive reference data usable for estimating a geographic position of the apparatus based on its distance from two or more base stations, and to receive updated reference data for at least one of the base stations and to determine an initial geographic position ($UE_{init}$) of the apparatus using the received reference data for a plurality of the base stations, including any updated reference data, and to establish a bidirectional communications link with at least one of the base stations.

20 Claims, 26 Drawing Sheets

(51) Int. Cl.
*G01S 5/02* (2010.01)
*H04W 56/00* (2009.01)
*H04W 64/00* (2009.01)

(52) U.S. Cl.
CPC ....... *H04W 56/005* (2013.01); *H04W 64/006* (2013.01)

(58) Field of Classification Search
CPC ............. H04W 74/02; H04W 74/0816; H04W 74/0866; H04W 76/19; H04W 88/02
USPC ........................ 370/328, 332, 352; 455/456.1
See application file for complete search history.

(56) References Cited

U.S. PATENT DOCUMENTS

| | | | |
|---|---|---|---|
| 2007/0030841 A1 | 2/2007 | Lee et al. | 370/352 |
| 2008/0045234 A1* | 2/2008 | Reed | H04W 4/023 |
| | | | 455/456.1 |
| 2009/0214216 A1* | 8/2009 | Miniscalco | H04B 7/18506 |
| | | | 398/99 |
| 2010/0197320 A1* | 8/2010 | Ulrich | H04W 48/16 |
| | | | 455/456.1 |
| 2014/0122142 A1* | 5/2014 | Podgurny | G06Q 10/06 |
| | | | 705/7.13 |
| 2014/0232201 A1* | 8/2014 | Staring | H02J 50/10 |
| | | | 307/104 |
| 2016/0110995 A1* | 4/2016 | Hirakawa | G08C 17/02 |
| | | | 340/12.22 |
| 2016/0187458 A1* | 6/2016 | Shah | H04W 4/02 |
| | | | 455/456.1 |
| 2018/0329023 A1 | 11/2018 | Perez-Cruz et al. | |
| 2019/0081688 A1* | 3/2019 | Deenoo | H04L 5/005 |
| 2020/0403457 A1* | 12/2020 | Nydell | H04B 10/616 |

FOREIGN PATENT DOCUMENTS

| | | |
|---|---|---|
| WO | WO 2006/099632 A2 | 9/2006 |
| WO | WO 2018/169563 A1 | 9/2018 |

* cited by examiner

POSITION DETERMINATION

CROSS REFERENCE TO RELATED APPLICATION

This patent application is a U.S. National Stage application of International Patent Application Number PCT/EP2019/057901 filed Mar. 28, 2019, which is hereby incorporated by reference in its entirety, and claims priority to PCT/EP2018/066939 filed Jun. 25, 2018 which is hereby incorporated by reference in its entirety.

FIELD

Embodiments relate to position determination, for example determining the position of radio user equipment.

BACKGROUND

In a radio communications system, it may be useful to determine the position of user equipment (UE). Position in this context refers to geographic position. For example, the position of the user equipment may be useful for optimization of radio resource management, for provision of position-based services and/or emergency positioning for indicating to emergency services an accurate location of the user equipment.

Some user equipment have on-board positioning receivers, e.g. Global Positioning System (GPS) or Global Navigation Satellite System (GNSS) receivers which can determine position with reference to satellites. However, there is not always sufficient satellite visibility to obtain a position and a contingency may be needed, particularly for mission critical applications. Other methods based on multilateration involve a relatively complex communication process involving the mobile network determining a user equipment's position.

SUMMARY

According to a first aspect, there is provided an apparatus, comprising means for: receiving, for each of a plurality of remote base stations, reference data usable for estimating a geographic position of the apparatus based on its distance from two or more of the base stations; within a predetermined update period, receiving updated reference data for at least one of the base stations; at the end of the predetermined update period, determining an initial geographic position ($UE_{init}$) of the apparatus using the received reference data for a plurality of the base stations, including any updated reference data; and establishing a bidirectional communications link with at least one of the base stations from which reference data is received, and receiving verification data therefrom usable to verify the accuracy of the initial geographic position ($UE_{init}$) or another geographic position derived therefrom.

The received reference data may be transmitted by each of the base stations and may comprise ToA reference data including an indication of a geographic position and a transmission time ($T_0$) of a reference signal or data, associated with the respective base station, the means further being configured to: receive, from each of the plurality of base stations, one or more reception times ($T_1$) of the transmitted ToA reference data; store the ToA reference data and the one or more reception times ($T_1$) for each respective base station in a database; within the predetermined update period, receiving for at least one of the remote base stations, further ToA reference data and/or one or more further reception times ($T_1$); updating the base station database using the further data and/or further reception times ($T_1$) for the at least one remote base station; and at the end of the predetermined update period, determining the initial geographic position ($UE_{init}$) of the apparatus based on the received geographic positions and the delay between the transmission time ($T_0$) and the reception time ($T_1$) of the transmitted reference signal stored in the database, including any update made within the predetermined update period.

The means may be configured to detect reception of a plurality of reception times ($T_1, T_2, T_3 \ldots T_{0+1}$) for at least one remote base station within the predetermined update period, and to select only one of said reception times to use in the base station database for initial position determination. The means may be configured to select the minimum reception time (min ($T_1, T_2, T_3 \ldots T_{0+1}$)) to use in the base station database for initial position determination. The means may be configured to determine the initial position ($UE_{init}$) based on the data in the database for a subset of base stations from which ToA reference data and a reception time ($T_1$) has been received. The initial position ($UE_{init}$) may be determined using a randomly-selected subset of base stations. A subset of three randomly-selected base stations are selected.

The means may be further configured to update the initial position ($UE_{init}$) by identifying at least one pair of base stations meeting a predetermined first criterion or criteria, based at least on their respective positions with respect to at least the initial position ($UE_{init}$), and using the reference data of the identified pair of base stations in the database to provide an updated position ($UE_{opt}$).

The means may be configured to identify the at least one pair of base stations based on the angle between vectors extending from the initial position ($UE_{init}$) to the respective positions of the base stations. The means may be configured to identify the pair of base stations having an angle between their respective vectors that is closest to 90 degrees.

The means may be configured to identify a plurality of base stations pairs having an angle between vectors that is within a predetermined allowable region, either side of 90 degrees. The allowable region may be substantially between 60 and 120 degrees.

The means may be further configured to update the initial position ($UE_{init}$) by identifying, for association with the or each pair of base stations, a respective third base station, which third base station is identified based on its relative position to the or each pair of base stations, the updated position ($U_{opt}$) being determined using the identified pair of base stations and the associated third base station. The means may be configured to identify the third base station based on it having a vector extending from the initial position ($UE_{init}$) which is opposite the angle between the identified pair of base stations. The identified third base station may be that having a vector extending from the initial position ($UE_{init}$) nearest to a vector extending substantially opposite the centre of the angle between the identified pair of base station.

The means may be configured to identify the at least one pair of base stations by analysing a set of base station constellations which define, for respective base station pairings, multiple spatial positions for which that pair of base stations provides an optimum positioning determination ($UE_{opt}$), the means further being configured to select a pair of base stations for which their corresponding constellation includes the current initial position ($UE_{init}$).

The set of base station constellations may each further define a third base station associated with the respective base station pairings, the constellations defining multiple spatial positions for which those three base stations provide an optimum positioning determination ($UE_{opt}$), the means further being configured to select those three base stations for which their corresponding constellation refers to the current initial position ($UE_{init}$).

The means may be configured to select base stations for which their corresponding constellation refers to the current initial position ($UE_{init}$) and the most other spatial positions.

The means may be further configured to determine a speed and heading vector using a plurality of consecutive optimum position determinations ($UE_{opt}$) during movement.

The means may be configured to identify one or more pairs of base stations to use for the consecutive optimum position determinations ($UE_{opt}$) by identifying a plurality of candidate base station pairs using a second criterion or criteria, and selecting one of the candidate base station pairs.

The second criterion may define that the candidate pairs of base stations have an angle between their respective vectors that is above a threshold angle $\theta_2$ given by:

$$\theta_2 = \sin^{-1} N\% \cdot \sin(UE_{opt})$$

where N % defines an allowable percentage variation from $UE_{opt}$.

The means may be further configured, in the event that greater than a threshold number of candidate base station pairs are identified, to apply a third criterion to reduce the number of candidate base station pairs to that which have angle between their respective vectors above a third angle $\theta_3$, where $\theta_3 > \theta_2$.

The means may be further configured to select the base station pair for which the determined heading vector is within the angle between their respective vectors and closest to a vector extending substantially mid-way between their respective vectors.

The verification data may comprise a timing advance (TA) signal received as part of a Radio Resource Control (RRC) synchronisation process.

The means may be configured to verify its one or more positioning determinations if:

$$TA_{n-1} \leq D \leq TA_{n+1}$$

wherein D is a computed distance D to the base station from which TA signal is received.

The means may be further configured, if the one or more positioning determinations cannot be verified, to update the one or more positioning determinations using data or signals received from the base station from which the verification data or verification signals are received.

The means may be further configured to transmit the one or more positioning determinations to a remote positioning system.

The means may be configured to transmit a positioning report, comprising the one or more positioning determinations, to a base station with which the apparatus has an active RRC connection, the positioning report further comprising an indication of the plurality of base stations used by the apparatus to determine the one or more positioning determinations, the base station providing the one or more positioning determinations to the remote positioning system.

The positioning report may further comprise an identifier of the apparatus.

The positioning report may further comprise the computed distance D to the base station from which the TA signal was received for verification.

The positioning report may further comprise a TA correction ($TA_{aenbue}$) received by the apparatus from the base station from which the TA signal was received for verification.

The positioning report may further comprise additional data items comprising one or more of: a height value of the apparatus, a flight plan, a heading vector, and speed of movement.

The apparatus may further comprise a means for determining geographic position based on received satellite signals, and wherein the means is further configured to use the one or more positioning determinations ($UE_{opt}$) in the event that the satellite-based means is unable to provide a geographic position or one within predefined limits.

The apparatus may further comprise a means for determining geographic position based on received satellite signals, and wherein the means is further configured to compare a position determined by the satellite based means with the one or more positioning determinations to determine if they substantially match.

The means may be configured, in the event of there being no match, to correct one of the positions based on the difference between the two positions.

The means may be configured to establish a bidirectional communications link with at least one of the base stations from which reference data is received using the GMS-R communications standard.

One or more of the base stations may be satellites comprising part of a non terrestrial network (NTN).

The initial position ($UE_{init}$) may be determined based on simultaneous usage of reference data received using different communications standards.

The geographic position of each respective base station may refer to the position of one or more antennas on or associated with the base station.

The receiving means may be configured to receive the geographic position of each base station in a radio frame or sub-frame or commonly agreed reference symbol of repetitive nature.

The radio frame or sub-frame may be one of a LTE, 5G or subsequent-generation radio frame.

The transmission time may indicate a physical transmission time of said reference signal or data from the base station.

The physical transmission time may be determined based on an absolute reference time at the base station modified by a delay time to account for processing at the base station.

The reception time of the transmitted data may indicate the physical reception time at the apparatus.

The physical reception time may be determined based on an absolute reference time at the user equipment modified by a delay time to account for processing at the apparatus.

The means may be configured to receive the transmitted data in a System Information Block (SIB).

The means may be configured to receive the transmitted data from a broadcast signal issued by the respective base stations.

The geographic position determining means may be configured to determine the one or more positioning determinations without the need of an active data connection to the base stations or in a Radio Resource Control (RRC) Idle state.

The means may be configured to determine said position by calculating the distances between the apparatus and the base stations using the respective time delays and the intersection of said calculated distances from the respective positions of the base stations.

The apparatus may be provided on an airborne vehicle.

According to a second aspect, there is provided a method, comprising: receiving, for each of a plurality of remote base stations, reference data usable for estimating a geographic position of the apparatus based on its distance from two or more of the base stations; within a predetermined update period, receiving updated reference data for at least one of the base stations; at the end of the predetermined update period, determining an initial geographic position ($UE_{init}$) of the apparatus using the received reference data for a plurality of the base stations, including any updated reference data; and establishing a bidirectional communications link with at least one of the base stations from which reference data is received, and receiving verification data therefrom usable to verify the accuracy of the initial geographic position ($UE_{init}$) or another geographic position derived therefrom.

The received reference data may be transmitted by each of the base stations and comprises ToA reference data including an indication of a geographic position and a transmission time ($T_0$) of a reference signal or data, associated with the respective base station, the method further comprising: receiving, from each of the plurality of base stations, one or more reception times ($T_1$) of the transmitted ToA reference data; storing the ToA reference data and the one or more reception times ($T_1$) for each respective base station in a database; within the predetermined update period, receiving for at least one of the remote base stations, further ToA reference data and/or one or more further reception times ($T_1$); updating the base station database using the further data and/or further reception times ($T_1$) for the at least one remote base station; and at the end of the predetermined update period, determining the initial geographic position ($UE_{init}$) of the apparatus based on the received geographic positions and the delay between the transmission time ($T_0$) and the reception time ($T_1$) of the transmitted reference signal stored in the database, including any update made within the predetermined update period.

The method may further comprise detecting reception of a plurality of reception times ($T_1, T_2, T_3 \ldots T_{0+1}$) for at least one remote base station within the predetermined update period, and to select only one of said reception times to use in the base station database for initial position determination.

The method may further comprise selecting the minimum reception time (min ($T_1, T_2, T_3 \ldots T_{0+1}$)) to use in the base station database for initial position determination.

The method may further comprise determining the initial position ($UE_{init}$) based on the data in the database for a subset of base stations from which ToA reference data and a reception time ($T_1$) has been received.

The initial position ($UE_{init}$) may be determined using a randomly-selected subset of base stations.

A subset of three randomly-selected base stations may be selected.

The method may further comprise updating the initial position ($UE_{init}$) by identifying at least one pair of base stations meeting a predetermined first criterion or criteria, based at least on their respective positions with respect to at least the initial position ($UE_{init}$), and using the reference data of the identified pair of base stations in the database to provide an updated position ($UE_{opt}$).

The method may further comprise identifying the at least one pair of base stations based on the angle between vectors extending from the initial position ($UE_{init}$) to the respective positions of the base stations.

The method may comprise identifying the pair of base stations having an angle between their respective vectors that is closest to 90 degrees.

The method may comprise identifying a plurality of base station pairs having an angle between vectors that is within a predetermined allowable region, either side of 90 degrees.

The allowable region may be substantially between 60 and 120 degrees.

The method may further comprise updating the initial position ($UE_{init}$) by identifying, for association with the or each pair of base stations, a respective third base station, which third base station is identified based on its relative position to the or each pair of base stations, the updated position ($U_{opt}$) being determined using the identified pair of base stations and the associated third base station.

The method may comprise identifying the third base station based on it having a vector extending from the initial position ($UE_{init}$) which is opposite the angle between the identified pair of base stations.

The identified third base station may be that having a vector extending from the initial position ($UE_{init}$) nearest to a vector extending substantially opposite the centre of the angle between the identified pair of base station.

The method may comprise identifying the at least one pair of base stations by analysing a set of base station constellations which define, for respective base station pairings, multiple spatial positions for which that pair of base stations provides an optimum positioning determination ($UE_{opt}$), and selecting a pair of base stations for which their corresponding constellation includes the current initial position ($UE_{init}$).

The set of base station constellations may each further define a third base station associated with the respective base station pairings, the constellations defining multiple spatial positions for which those three base stations provide an optimum positioning determination ($UE_{opt}$), and selecting those three base stations for which their corresponding constellation refers to the current initial position ($UE_{init}$).

The method may comprise selecting base stations for which their corresponding constellation refers to the current initial position ($UE_{init}$) and the most other spatial positions.

The method may further comprise determining a speed and heading vector using a plurality of consecutive optimum position determinations ($UE_{opt}$) during movement.

The method may comprise identifying one or more pairs of base stations to use for the consecutive optimum position determinations ($UE_{opt}$) by identifying a plurality of candidate base station pairs using a second criterion or criteria, and selecting one of the candidate base station pairs.

The second criterion may define that the candidate pairs of base stations have an angle between their respective vectors that is above a threshold angle $\theta_2$ given by:

$$\theta_2 = \sin^{-1} N\% \cdot \sin(UE_{opt})$$

where N % defines an allowable percentage variation from $UE_{opt}$.

The method may further comprise, in the event that greater than a threshold number of candidate base station pairs are identified, applying a third criterion to reduce the number of candidate base station pairs to that which have angle between their respective vectors above a third angle $\theta_3$, where $\theta_3 > \theta_2$.

The method may further comprise selecting the base station pair for which the determined heading vector is within the angle between their respective vectors and closest to a vector extending substantially mid-way between their respective vectors.

The verification data may comprise a timing advance (TA) signal received as part of a Radio Resource Control (RRC) synchronisation process.

Verifying one or more positioning determinations may occur if:

$$TA_{n-1} \leq D \leq TA_{n+1}$$

wherein D is a computed distance D to the base station from which TA signal is received.

The method may further comprise, if the one or more positioning determinations cannot be verified, updating the one or more positioning determinations using data or signals received from the base station from which the verification data or verification signals are received.

The means may be further configured to transmit the one or more positioning determinations to a remote positioning system.

The method may comprise transmitting a positioning report, comprising the one or more positioning determinations, to a base station with which the apparatus has an active RRC connection, the positioning report further comprising an indication of the plurality of base stations used to determine the one or more positioning determinations, the base station providing the one or more positioning determinations to the remote positioning system.

The positioning report may further comprise an identifier of the apparatus.

The positioning report may further comprise the computed distance D to the base station from which the TA signal was received for verification.

The positioning report may further comprise a TA correction ($TA_{aenbue}$) received by the apparatus from the base station from which the TA signal was received for verification.

The positioning report may further comprise additional data items comprising one or more of: a height value of the apparatus, a flight plan, a heading vector, and speed of movement.

The method may further comprise determining geographic position based on received satellite signals, and using the one or more positioning determinations ($UE_{opt}$) in the event that the satellite-based means is unable to provide a geographic position or one within predefined limits.

The method may further comprise determining geographic position based on received satellite signals, and comparing a position determined by the satellite based means with the one or more positioning determinations to determine if they substantially match.

In the event of there being no match, the method may comprise correcting one of the positions based on the difference between the two positions.

The method may comprise establishing a bidirectional communications link with at least one of the base stations from which reference data is received using the GMS-R communications standard.

One or more of the base stations may be satellites comprising part of a non terrestrial network (NTN).

The initial position ($UE_{init}$) may be determined based on simultaneous usage of reference data received using different communications standards.

The geographic position of each respective base station may refer to the position of one or more antennas on or associated with the base station.

Receiving may comprise receiving the geographic position of each base station in a radio frame or sub-frame or commonly agreed reference symbol of repetitive nature.

The radio frame or sub-frame may be one of a LTE, 5G or subsequent-generation radio frame.

The transmission time may indicate a physical transmission time of said reference signal or data from the base station.

The physical transmission time may be determined based on an absolute reference time at the base station modified by a delay time to account for processing at the base station.

The reception time of the transmitted data may indicate the physical reception time at the apparatus.

The physical reception time may be determined based on an absolute reference time at the user equipment modified by a delay time to account for processing at the apparatus.

The transmitted data may be received in a System Information Block (SIB).

The transmitted data may be received from a broadcast signal issued by the respective base stations.

The method may comprise determining the one or more positioning determinations without the need of an active data connection to the base stations or in a Radio Resource Control (RRC) Idle state.

The method may comprise determining the position by calculating the distances between the apparatus and the base stations using the respective time delays and the intersection of said calculated distances from the respective positions of the base stations.

The method may be performed on an airborne vehicle.

According to another aspect, there may be provided a computer program product comprising a set of instructions which, when executed on an apparatus, is configured to cause the apparatus to carry out the method comprising: receiving, for each of a plurality of remote base stations, reference data usable for estimating a geographic position of the apparatus based on its distance from two or more of the base stations; within a predetermined update period, receiving updated reference data for at least one of the base stations; at the end of the predetermined update period, determining an initial geographic position ($UE_{init}$) of the apparatus using the received reference data for a plurality of the base stations, including any updated reference data; and establishing a bidirectional communications link with at least one of the base stations from which reference data is received, and receiving verification data therefrom usable to verify the accuracy of the initial geographic position ($UE_{init}$) or another geographic position derived therefrom.

According to another aspect, there may be provided a non-transitory computer readable medium comprising program instructions stored thereon for performing a method, comprising: receiving, for each of a plurality of remote base stations, reference data usable for estimating a geographic position of the apparatus based on its distance from two or more of the base stations; within a predetermined update period, receiving updated reference data for at least one of the base stations; at the end of the predetermined update period, determining an initial geographic position ($UE_{init}$) of the apparatus using the received reference data for a plurality of the base stations, including any updated reference data; and establishing a bidirectional communications link with at least one of the base stations from which reference data is received, and receiving verification data therefrom usable to verify the accuracy of the initial geographic position ($UE_{init}$) or another geographic position derived therefrom.

According to another aspect, there may be provided an apparatus comprising: at least one processor; and at least one memory including computer program code which, when executed by the at least one processor, causes the apparatus: to receive, for each of a plurality of remote base stations, reference data usable for estimating a geographic position of the apparatus based on its distance from two or more of the base stations; within a predetermined update period, to receive updated reference data for at least one of the base stations; at the end of the predetermined update period, to determine an initial geographic position ($UE_{init}$) of the apparatus using the received reference data for a plurality of the base stations, including any updated reference data; and to establish a bidirectional communications link with at least one of the base stations from which reference data is received, and receiving verification data therefrom usable to verify the accuracy of the initial geographic position ($UE_{init}$) or another geographic position derived therefrom.

BRIEF DESCRIPTION OF DRAWINGS

Example embodiments will now be described by way of non-limiting example, with reference to the accompanying drawings, in which.

DETAILED DESCRIPTION

Embodiments herein relate to position determination in the context of radio user equipment (UE), such as, but not limited to, mobile telephones or smartphones, but can also be applied to other mobile radio equipment. Position in this context means geographic position. Embodiments may also relate to real-time or near real-time positioning or tracking of vehicles, including airborne vehicles, wherein accuracy is important for safety and security purposes. For example, the UE may form part of, or be within, a drone or passenger-carrying aircraft. In an air traffic management system, a flying vehicle position may be used for route prediction, conflict detection and/or resolution.

Satellite-based solutions provide good accuracy, but contingency is needed should such signals not be available or usable, particularly in the case of airborne vehicles. Example embodiments provide such a contingency in a time and processing-efficient manner, compared with, for example Observed Time Difference of Arrival (OTDOA) techniques. Given the nature of certain applications, example embodiments may also provide for technical verification that a positioning report issued by a UE, e.g. a UE, actually came from that UE and its real position matches the reported position. This is to avoid jamming or spoofing. Example embodiments may also provide known, constant and/or predictable error distribution information for tracking purposes, based on a UE's current position with respect to base station constellations used in the positioning process.

Subsequent references to UE (or UEs) may refer to any form of UE device for which position may be determined using data. Subsequent references to base station(s) means any reference node or reference site having radio transmitting and/or receiving capability.

Figure 1A:
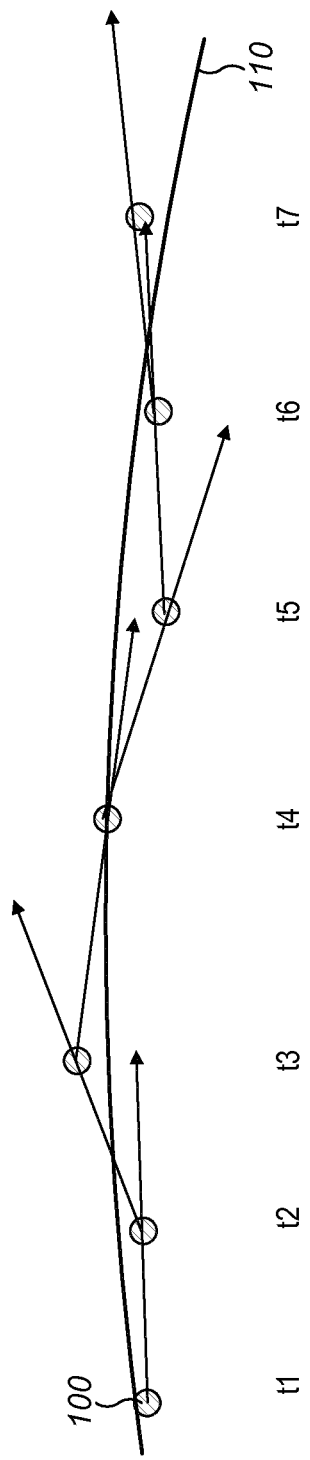
FIG. 1A is a schematic view of how a target may be tracked by continuous detection.
Figure 1B:
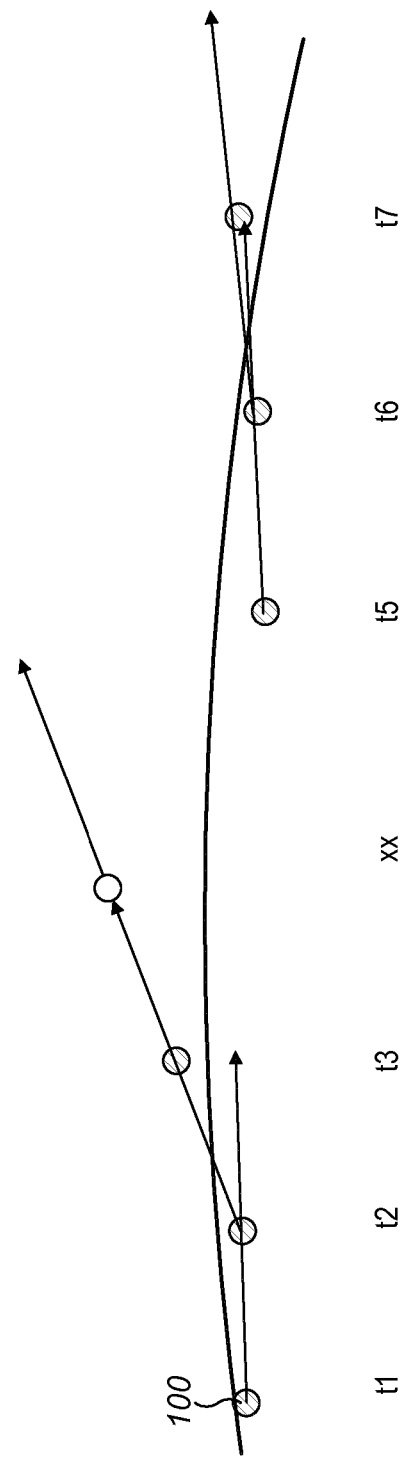
FIG. 1B is a schematic view of how a target may be tracked with gaps in the trajectory path.

Referring to FIG. 1A, when a UE 100 is tracked by a real-time operational system, a tracking system may be able to determine the UE's position, velocity, acceleration and heading using consecutive positioning reports, which are updated with the given update interval at times t1, t2, ... t7. The tracking system may comprise logic which uses different algorithms, values and weights to determine an optimum path for the given type of movement, e.g. linear or manoeuvring. The final UE path may be similar to the solid line 110 presented in FIG. 1A. Upon receiving a UE position update, the logic may predict the next position of the UE 100 based on the track history. This is especially important in the case of missing detections, resulting in gaps in the trajectory path, as shown on FIG. 1B. In such a case, the algorithm may match the predicted movement type and it may be possible to compensate for such a gap and continue tracking. Alternatively, tracking may be lost, as also shown in FIG. 1B, where prediction of the next UE position was not correct at t=t4. The quality of UE tracking depends on UE position ambiguity and associated measurements errors. Each positioning source may be characterized by measurement error characteristics and/or provided tolerances. An operational system should preferably know such characteristics to include into prediction algorithms, as potential inaccuracies may impact position determination quality.

Figure 2A:
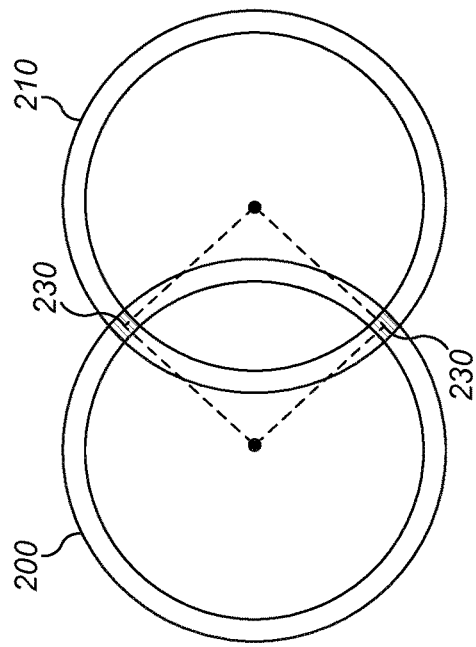
FIGS. 2A-C are schematic top-plan views indicating how the position of a target may be estimated using range rings from respective base stations.
Figure 2B:
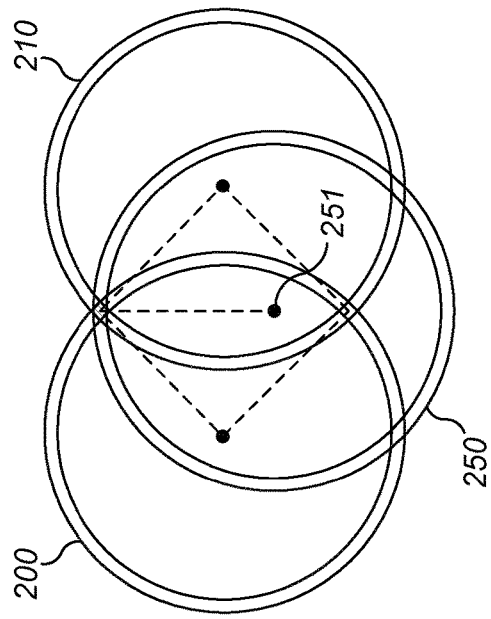
Figure 2C:
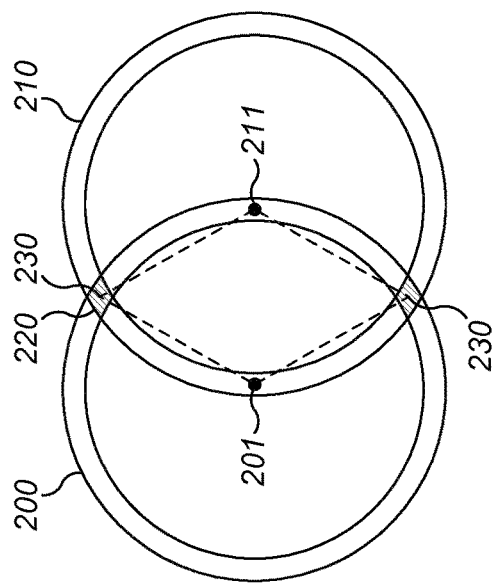

For example, and with reference to FIGS. 2A-2C, Time Of Arrival (TOA) measurement errors may be expressed in the form of range circles 200, 210 of a given size. The range circles 200, 210 are associated with respective base stations 201, 211. A UE's position may be where the circles intersect. The intersection areas 230 have a characteristic shape and size, meaning that a UE 220 may be located with tolerances related to the size of each intersection area. As may be seen in FIGS. 2A-2C, with two base stations, the accuracy of the UE's position depends on the intersection angle, and the position is ambiguous because the range rings 200, 210 can intersect at two different points. The lowest position ambiguity occurs if the range rings intersect at an angle of 90 degrees, as shown in FIG. 2B. In this case, the intersection area 230 has a square shape. If the range rings 200, 210 intersect with a different angle, the intersection area 230 has a diamond shape, which means lower accuracy.

Figure 3:
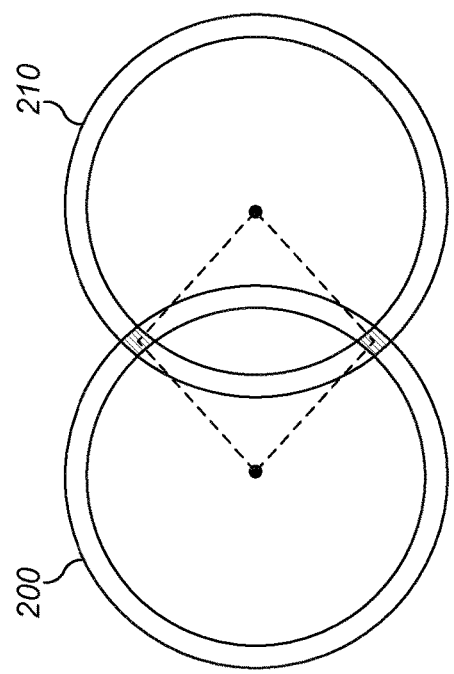
FIG. 3 is a schematic top-plan view indicating how the position of a target may be estimated in three-dimensions, using range rings from three base stations.

Referring now to FIG. 3, in three-dimensional (3D) space, it may be assumed that the lowest volume of intersection occurs when three different range spheres 200, 210, 250 cross each other at an angle of 90 degrees. In practice, such an assumption requires that a third reference source, e.g. third base station 251, be directly above or beneath the UE 220. If mobile network base stations (eNBs) are considered, this may have impact on eNB antenna mast requirements, which may be a problem in field applications. With three base stations 201, 211, 251, it is found that the optimum angle is 120 degrees, which is the equivalent of a circle inscribed inside a triangle. In this case, the ambiguity area 260 has a regular hexagon shape. In general, adding more base stations decreases the positioning ambiguity and the intersection area, approaching to a circle shape.

In the case of Non Terrestrial Network (NTN) applications, where wireless UE communication is provided by satellites, three-dimensional (3D) UE positioning may be improved. Also, a combination of a ground based mobile network and a NTN infrastructure, if supported by the UE, may be used for UE positioning.

In practice, due to base station deployment, regular arrangements of base station constellations may be rare. Further, additional base stations require additional processing time and capacity, and any achievable improvement in accuracy may not be justified. Using additional base stations also requires additional error distributions and/or these may be valid only if all of the base stations are used. This means that, in practice, three base stations may be considered sufficient for positioning purposes, so long as the constellation is suitable, which is considered herein. Put another way, it may be better to use a lower accuracy constellation of three base stations with known error characteristics rather than a higher accuracy system with little known error characteristics.

In this regard, a base station constellation may mean a particular spatial arrangement of two or more base stations, in much the same way as the spatial arrangement of planetary bodies is referred to as a constellation.

Example embodiments involve using the intersection of first and second range rings, associated with respective base stations, as a base measure for further analysis. The effect of the third base station is found to have relatively minor impact, and hence embodiments may involve selecting one or more pairs of base stations as a base for providing improved or optimised positioning using TOA principles. Specifically, we refer to the use of Measured TOA (MTOA) principles which will be outlined below, but generally-speaking the abbreviation TOA is used to indicate the generality of example embodiments which use TOA measurements.

The following abbreviations may be referred to below:
CSI—Channel State Information;
CQI—Channel Quality Indicator;
GPS—Global Positioning System;
GNSS—Global Navigation Satellite System;
GUI—Graphical User Interface;
MIB—Master Information Block;
MTOA—Measured Time Of Arrival;
OTDOA—Observed Time Difference Of Arrival;
PSS—Primary Synchronization Signal;
RACH—Random Access Channel;
RRC—Radio Resource Control;
SIB—System Information Block;

SSS—Secondary Synchronization Signal;

TOA—Time Of Arrival;

UE—User Equipment;

Measured TOA (MTOA)

Embodiments herein provide apparatuses and methods, which may be implemented in hardware, software, or a combination thereof, whereby a user equipment (or "UE") may determine its own position, i.e. locally, based on data indicative of the geographic position of two or more base stations (where the height is not required) or three or more base stations where the height is required. Base stations may comprise eNBs in the context of LTE or 5G, but the term may be considered more generally as applying to any reference site belong to a radio network. The position may also be based on a transmission time of a reference signal or reference data, which could be the time of transmitting the position data or the time of transmitting any other reference signal or to reference data, which can be any agreed signal or data which has a repetitive nature. It may for example be the time of the start of a particular frame or a sub-frame or any agreed symbol. For ease of reference, we will refer to reference signal and/or reference data. The transmission time may be considered the actual physical transmission time. This enables the UE to calculate the delay between the transmission time and the reception time of the data for each base station and hence the distance from each base station position. It follows that by plotting in two or three dimensions the intersection points of the three distances, an accurate position determination can be made by the UE without the need to send data to the radio network.

This process may be referred to as MTOA, for example to distinguish the process from OTDOA, although TOA is referred to subsequently for ease of reference. Embodiments herein assume the use of a LTE/5G UE and associated base station systems (eNBs) and networks. It will however be appreciated that the embodiments are applicable generally to other forms of radio UEs and base station infrastructures, including future generation cellular radio systems.

Embodiments may use base station antenna position coordinates (X, Y, H), where H refers to height, and the exact time $T_0$ when the given LTE/5G radio frame providing in this case the agreed reference data or signal was physically sent by the antenna system of the base station. H may relate to both terrain and mast height. This method is therefore based on Time Of Arrival (ToA) principles. The antenna position coordinates (X, Y, H) generally refer to the position of the antenna itself on the mast or similar position of the base station, but we will refer to base station for ease of explanation.

In some embodiments, such data may be broadcasted by base stations as part of cell System Information Blocks (part of SIB 15) or delivered in any other way to the UE. In some embodiments, no active connection (RRC_CONNECTED) is required by the UE to the base stations to calculate the UE position based on base station signalling messages. That is, the UE may be in the RRC_IDLE state. Indeed, embodiments may not require any reference signalling (such as RSTD in the case of OTDOA) as frame or sub-frame signalling may be used for UE positioning embodiments herein.

Figure 4:
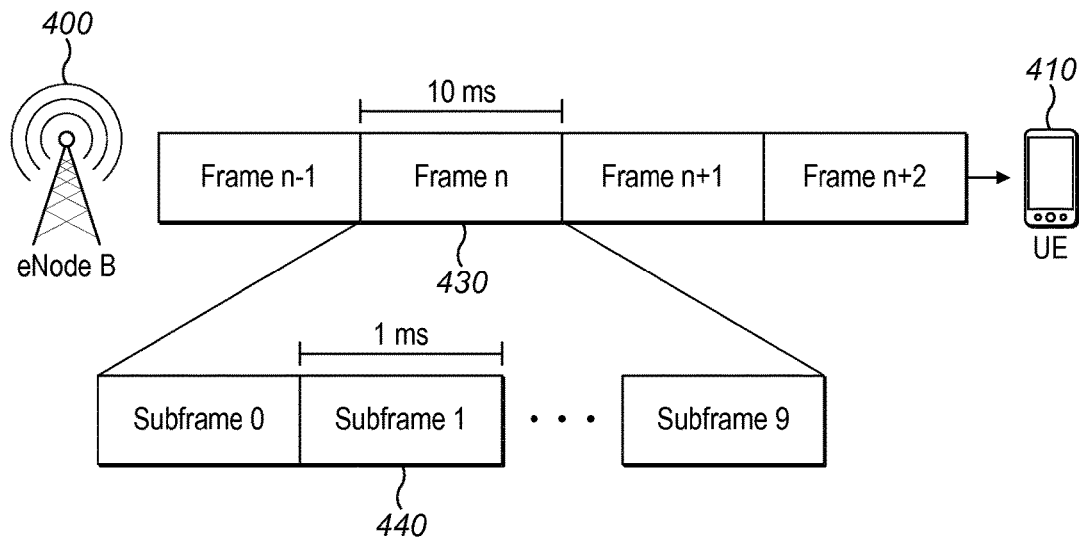
FIG. 4 is a schematic diagram of a typical LTE frame structure transmitted between a base station and a target.

FIG. 4 is a schematic diagram of a typical LTE frame structure transmitted between a base station (eNB) 400 and a UE 410.

Example embodiments assume the following:

the speed of light (c), including 3G/LTE/5G microwaves, in a vacuum is 299792458 m/s, approximately 299700000 m/s in air, and may be rounded to 300000 km/s;

in 1 µs a distance of 300 metres is travelled by a RF microwave signal;

time synchronisation sources like GPS may give an absolute time value with an accuracy of 97 ns (1 sigma), rounded to 0.1 µs, approximately 30 metres in distance;

an LTE frame 430 is 10 ms long, and an LTE sub-frame 440 is 1 ms long; and the distance travelled by an RF signal in 10 ms is equal approximately to 3000000 metres.

The purpose of giving these assumptions is to resolve potential ambiguity in describing example embodiments with respect to a typical cell maximum range. If alternative figures are assumed, then appropriate modifications will apply.

Figure 5:
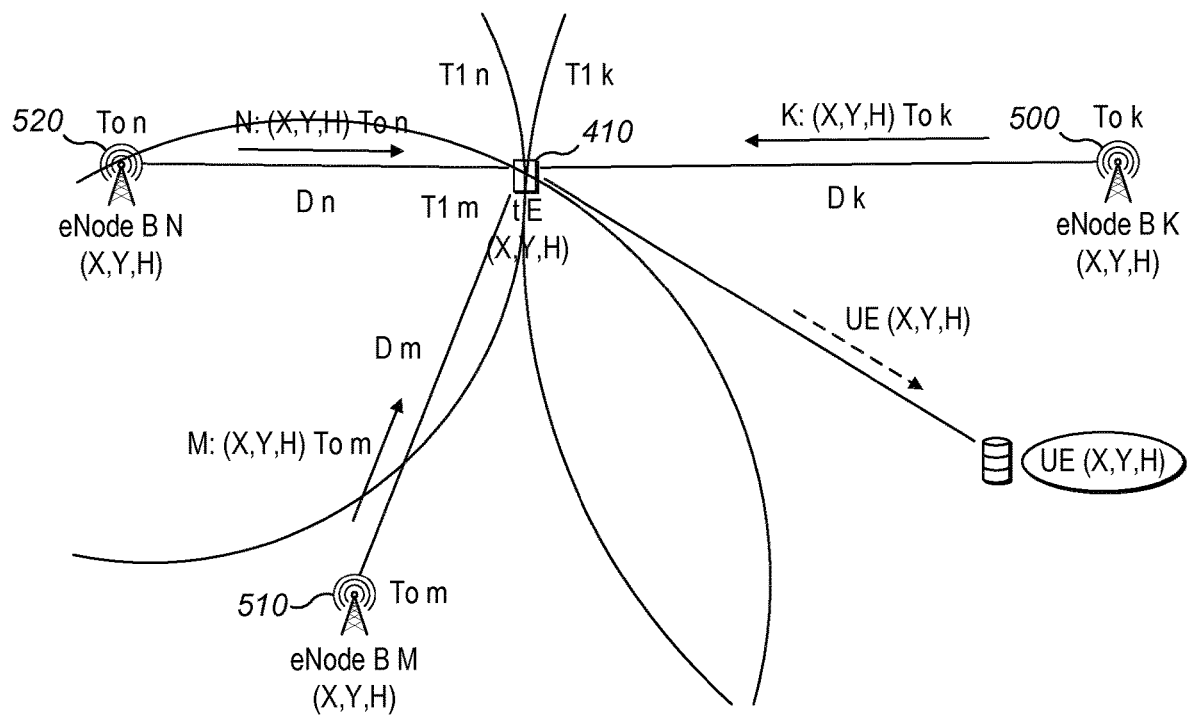
FIG. 5 is a schematic diagram of a target according to example embodiments in relation to three geographically separate base stations.

FIG. 5 is a schematic diagram of the UE 410 in relation to three geographically separate base stations 500, 510, 520 to illustrate example embodiments. The base stations 500, 510, 520 are referred to in FIG. 5 as eNodeB K, eNodeB M and eNodeB N respectively. Other embodiments may use more than three base stations using substantially the same procedure.

Example embodiments involve the UE 410 determining its position using TOA principles. The distances (Dk, Dm, Dn) of the UE 410 from the base stations 500, 510, 520 may be calculated using:

$$Dk = c \cdot (T_1 k - T_0 k);$$

$$Dm = c \cdot (T_1 m - T_0 m); \&$$

$$Dn = c \cdot (T_1 n - T_0 n)$$

where c is the speed of light, $T_0 k$, $T_0 m$, $T_0 n$ are respectively the time of physical transmission of the data from the respective base stations 500, 510, 520 and $T_1 k$, $T_1 m$, $T_1 n$ are respectively the time of physical reception of the data from the respective base stations by the apparatus.

Figure 6:
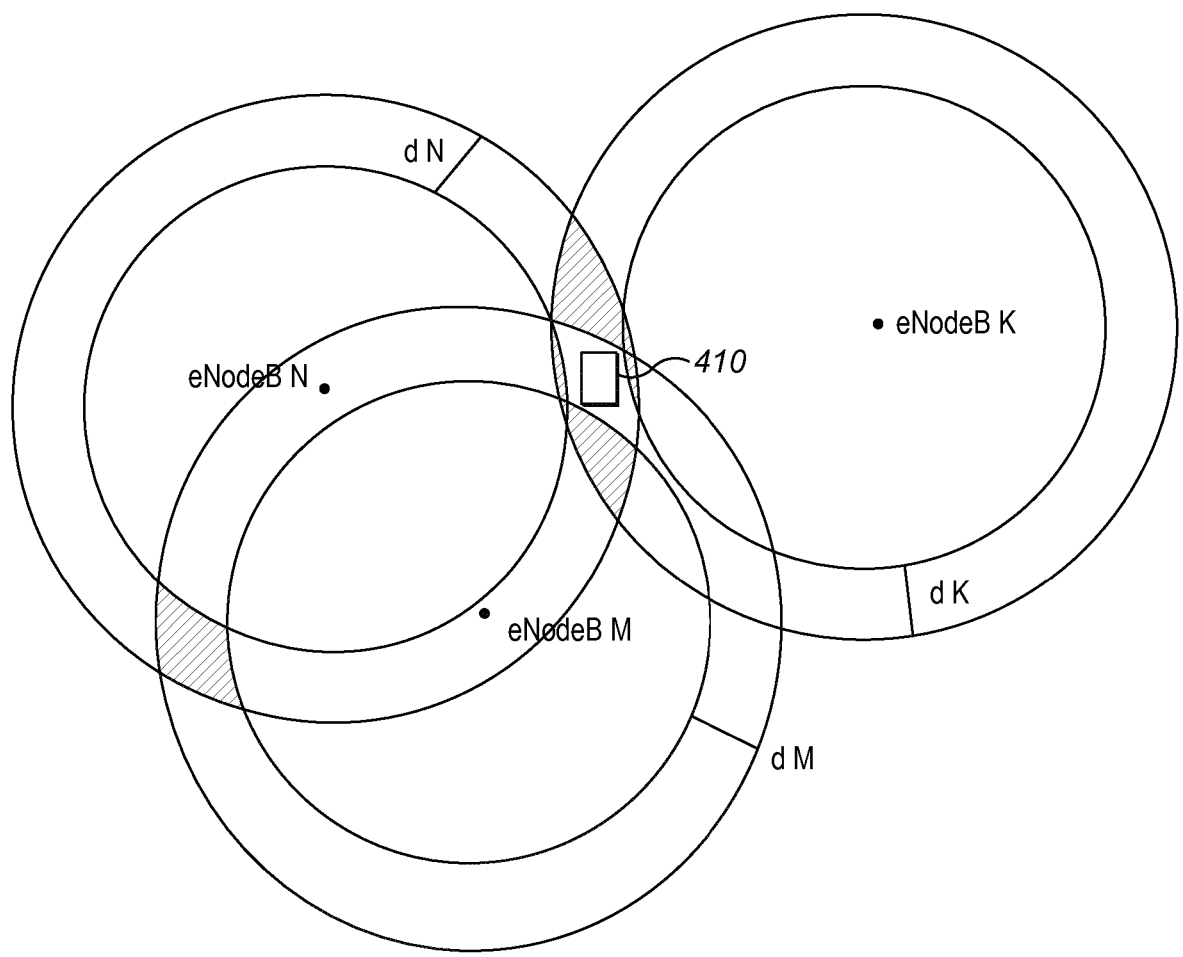
FIG. 6 is a schematic diagram similar to FIG. 5, indicating the effect of inaccuracies.

The determined distances Dk, Dm, Dn correspond to potential positions of the UE 410 on circles, or range rings, in a two-dimensional perspective as shown in FIG. 6, and the intersection of the circles gives the approximate position of the UE (X, Y, H).

The position of the UE 410 can also be determined in a three-dimensional perspective, which may be calculated using:

$$D_{UE\ eNodeB\ k}(X, Y, H) = \sqrt{((X_{eNodeB\ k} - X_{UE})^2 + (Y_{eNodeB\ k} - Y_{UE})^2 + (H_{eNodeB\ k} - H_{UE})^2)};$$

$$D_{UE\ eNodeB\ m}(X, Y, H) = \sqrt{((X_{eNodeB\ m} - X_{UE})^2 + (Y_{eNodeB\ m} - Y_{UE})^2 + (H_{eNodeB\ m} - H_{UE})^2)};$$

$$D_{UE\_eNodeB\_n}(X, Y, H) =$$

$$\sqrt{((X_{eNodeB\_n} - X_{UE})^2 + (Y_{eNodeB\_n} - Y_{UE})^2 + (H_{eNodeB\_n} - H_{UE})^2)};$$

where $D_{UE\_eNodeB}$ (X, Y, H) is the distance D between the apparatus and the given base station k, m, n, $X_{eNodeB}$, $Y_{eNodeB}$, $H_{eNodeB}$ are the base station coordinates and $X_{UE}$, $Y_{UE}$, $H_{UE}$ are the apparatus coordinates.

In the three-dimensional case, as mentioned above, the intersection of spheres gives the position of the UE 410 (X, Y, H).

Referring to FIG. 6, it will be appreciated that any inaccuracy in the time or distance measurements, including any synchronisation issues, may dilute the precision of the position determination of the UE 410. As will be observed, the circles (or spheres) produced by the above expressions will have a range of potential values and hence the overlap or intersection will produce an area within which the UE 410 is located, and hence the determination is less accurate.

In determining its position (X, Y, H), the UE 410 may operate in an RRC_IDLE mode. The UE 410 may also operate in an RRC_CONNECTED mode, as the mode has no impact on the method employed in the example embodiments herein. However, if the position of the UE 410 is to be reported to the mobile network via one of the base stations 500, 510, 520 (which may be useful in some situations) then the UE will need to switch to the RRC_CONNECTED mode, if not already in said mode.

The UE 410 by its nature is a mobile device and hence may move position over time. The UE 410 may therefore continuously, or at a periodic update rate, monitor and measure the relevant signals from the base stations 500, 510, 520 within range to determine its ongoing position, if needed.

There are a number of possible methods by which each base station 500, 510, 520 may deliver their respective position (X, Y, H) and exact time of LTE/5G frame transmission to the UE 410.

For example, each base station 500, 510, 520 may transmit its position data (X, Y, H) in a broadcast transmission or as part of a SIB. For example, each base station 500, 510, 520 may transmit the position data (X, Y, H) to a database, e.g. a mobile network database, which can be accessed by the UE 410. This data may be accessible directly or by linking with Cell ID data.

Enhanced Method using TOA

Figure 7:
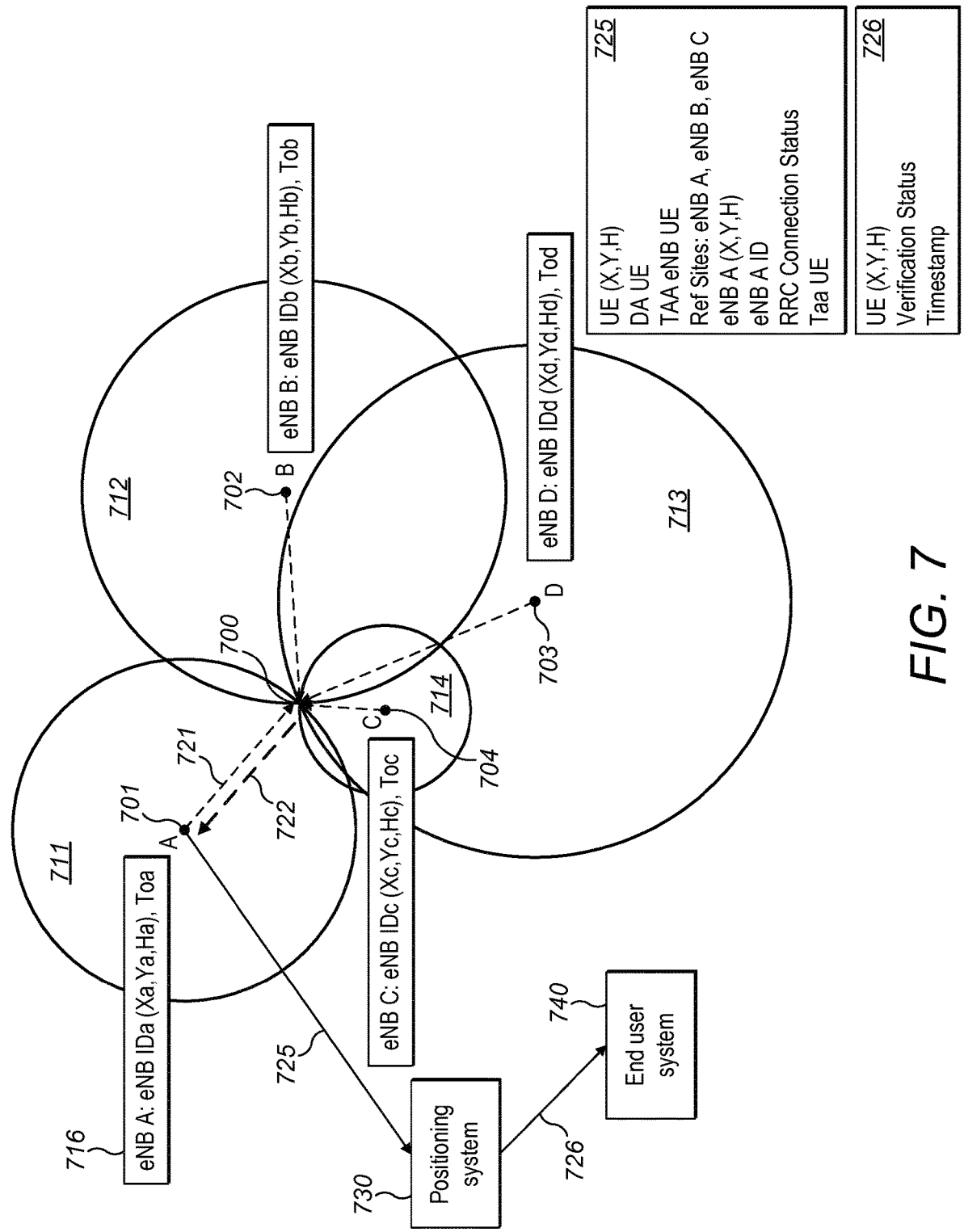
FIG. 7 is a schematic top-plan view of a system according to some example embodiments.

FIG. 7 shows in overview a UE 700 within part of a communications network comprising, in this scenario, four base stations 701-704, labelled "A"-"D" respectively. Each base station 701-704 has an associated range area 711-714 bounded by a range ring. The UE 700 may be any type of mobile radio device mentioned previously, and example embodiments take the example of an airborne vehicle, such as a drone. Example embodiments use the above-described TOA concept for enhanced and efficient position determination of UEs, such as the UE 700, which may determine its own position, i.e. UE (X, Y, H), as part of a positioning report 725. Each base station 701-704 may be configured to provide TOA reference data, such as a set of data indicated by reference numeral 716 for the first base station 701.

FIG. 7 may be referred to throughout this disclosure for reference.

As will be explained, example embodiments enable multipath propagation to be taken into account and one or more optimum base station constellations to be selected. In this regard, a base station constellation means a particular spatial arrangement of two or more base stations, in much the same way as the spatial arrangement of planetary bodies is referred to as a constellation. For example, the relative positions of the first and second base stations 701, 702 may comprise a first constellation {eNB A, eNB B}, the relative positions of the first, second and third base stations 701-703 a second constellation {eNB A, eNB B, eNB C} and the relative positions of the second and third base stations 702, 703 a third constellation {eNB B, eNB C} and so on.

Having measured its own position UE (X, Y, H), and provided it in the positioning report 725, the UE 700 may switch to a RRC_CONNECTED state and use a received "Timing Advance" (TA) correction value, as indicated by the arrow 721, to determine whether or not this provides a substantial match to the self-determined UE position and distance, based on the TOA method. Thereby, the UE 700 may perform a technical verification of its own position.

As shown in FIG. 7, a positioning system 730 may receive the positioning report 725 from the UE 700, either directly, or more likely via a base station such as the first base station 701. The positioning system 730 may be a remote entity of the network which can gather positioning reports 725 from one or many UEs to perform a second technical verification, in addition, or as an alternative to that performed by the UEs, to confirm that, for example, the UE 700 is real and that its reported position matches that in the positioning report 725. The positioning system 730 may provide at least part of the positioning report, for example a verified position and verification status and/or timestamp, in a verified position message 726 to another entity, such as an end user system 740. The end user system 740 may be an air traffic control system, or similar.

As for error distribution, the area of ambiguity mentioned previously is found to depend on the relative positions of the two or more base stations 701-704 used in the TOA method, and the position of the UE 700. This may change frequently if the UE 700 is in motion.

Figure 8:
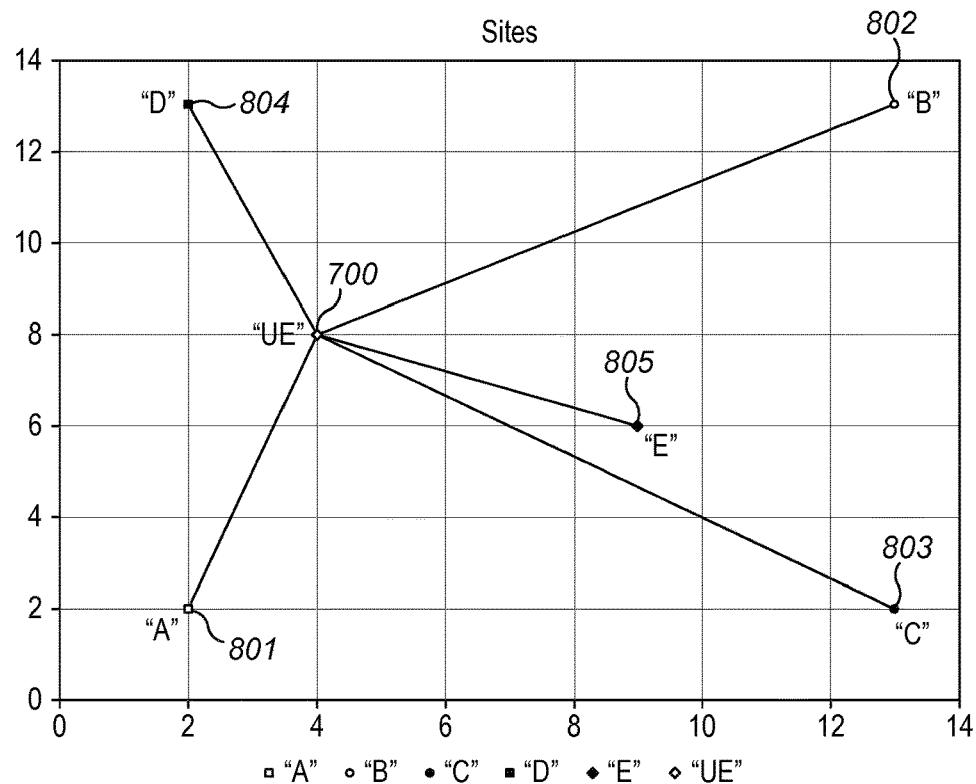
FIG. 8 is a grid representing the position of a target, shown in FIG. 7, in relation to a plurality of base stations, according to some example embodiments.
Figure 9:
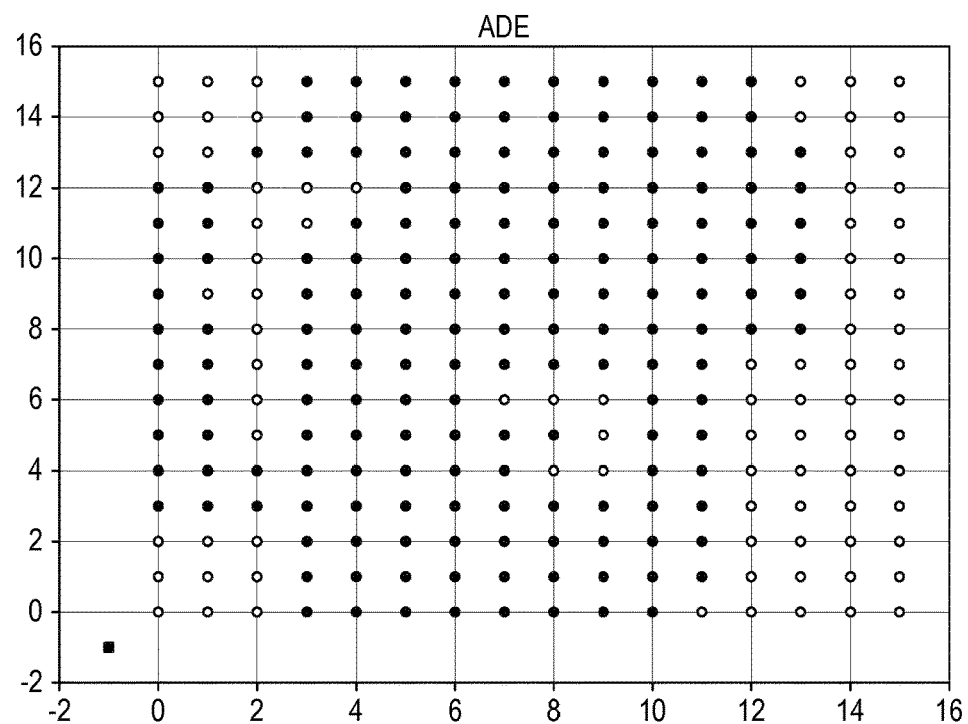
FIG. 9 is a grid representing possible positions of the FIG. 7 target for which selected base stations may be determined as optimal for positioning, according to some example embodiments.
Figure 10:
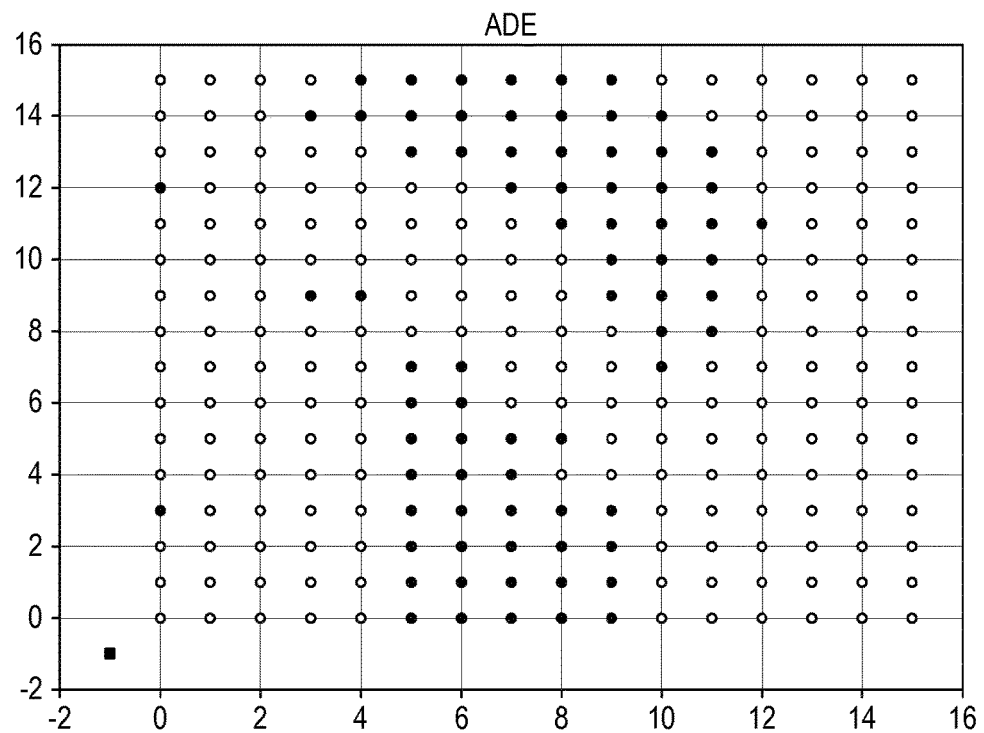
FIG. 10 is an alternative grid representing possible positions of the FIG. 7 target for which selected base stations may be determined as optimal for positioning, according to some example embodiments.
Figure 11:
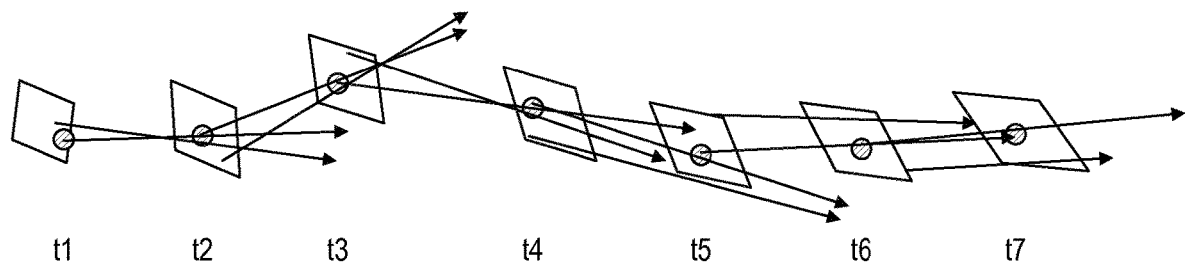
FIG. 11 is a schematic view of how a target may be tracked where known base stations are used for positioning, according to some example embodiments.

For example, FIG. 8 shows the UE 700 in relation to five base stations 801-805, respectively labelled A-E. The UE 700 is shown at an (X, Y) position of (4,8) and has specific angular relationships with respect to each base station 801-805. The angles may be determined based on knowledge of each base station's respective position. For example, an angle A-UE-D is equal to approximately 140 degrees, which provides an ambiguity shape similar to those in FIGS. 2B and 2C, i.e. diamond-like. However, if the first base station 801 and the fifth base station 805 are used as a base pair, the angle between them and the UE 700 will be approximately 86 degrees, meaning that the ambiguity shape will be nearly square, which is the preferred minimum in the case of 2D UE (X, Y) positioning. As a third set of base station reference data is required for 3D positioning of the UE (X, Y, H), an additional base station should be chosen from the existing ones. In this case, the fourth base station 804 may be used, because the constellation of base stations "A-E-D" may provide in 3D a minimal ambiguity value with respect to other possible configurations. Furthermore, for this constellation of base stations "A-E-D", other theoretical positions may be identified, as indicated by the solid dots in FIG. 9, which indicate positions where the A-E-D constellation remains optimal. Based on this knowledge, it may be possible to more accurately determine the position of the UE 700. When the UE 700 is in motion, angular and/or azimuthal relations may change, meaning that a current base station constellation may no longer be optimal. To handle this issue, other criteria may be used to select optimal base stations. Referring to FIG. 10, for example, if the UE 700 at position (4, 8) is moving towards or from any of the solid dot positions, e.g. position (10, 10), the base station constellation A-D-E may still provide an optimal or the best-error distribution. In case of other, non-solid dot positions, another constellation should be determined and used. FIG. 11 shows how the tracking of the UE 700 at the end user system 740, based on the positioning reports from the UE, may use the improved position data to more accurately track and/or predict motion of the UE 700 in real-time or near real-time. This accuracy comes from one or more of the use of one or more optimal constellations for position determination, and known or predictable error distributions.

Figure 12:
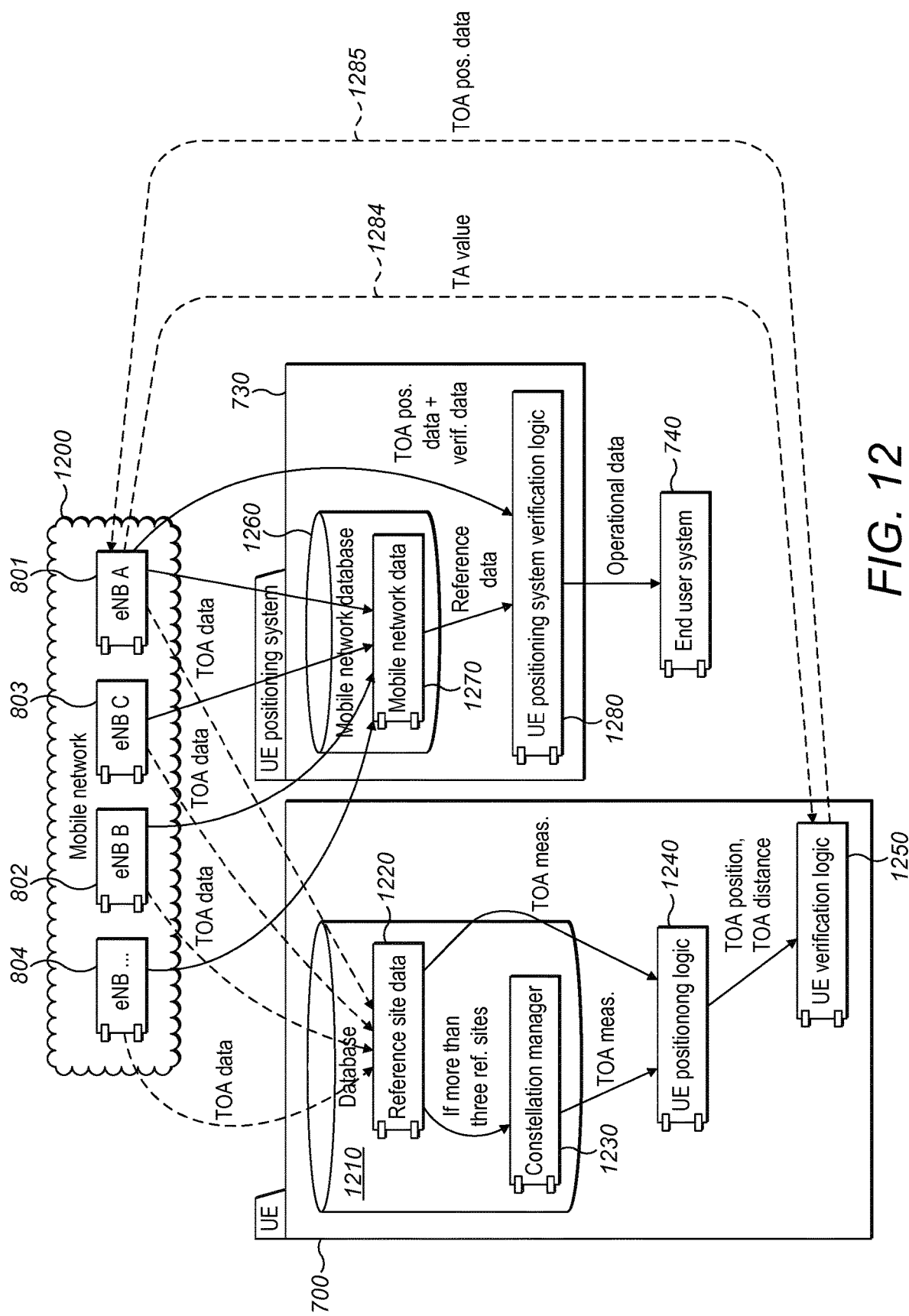
FIG. 12 is a schematic view, showing components of the FIG. 7 system in greater detail.

FIG. 12 shows a system in accordance with some example embodiments. The system comprises a UE 700, the positioning system 730, an optional end user system 740 and a communications network 1200 (hereafter "network") comprising a plurality of base stations 801-804. For example, the network 1200 may be a mobile communications network. The UE 700 may comprise a database 1210, which may comprise any form of data storage means for storing data in a structured way. Within the database 1210 may be received and stored base station or reference site data 1220. A constellation manager 1230 is further provided for determining a preferred constellation of base stations 801-804 to use if more than three base stations are in range of the UE 700. The UE 700 may also comprise UE positioning logic 1240, which operates according to the TOA method, outlined previously. The UE 700 may also comprise UE verification logic 1250. Said constellation manager 1230, UE positioning logic 1240 and UE verification logic 1250 may be implemented in hardware, software or combination thereof. The UE positioning system 730 may comprise a mobile network database 1260, for storing mobile network data 1270, and UE positioning system verification logic 1280, which may be implemented in hardware, software or a combination thereof.

In operation, the UE may gather and process received eNB (X,Y,H) co-ordinates, the value of $T_0$, and optionally an identifier of the base station or eNB and store it in the database 1210. This data may be referred to as base station reference data. The base station reference data may be received from broadcasts or other transmissions, or such base station reference data may be predefined and downloaded to the UE 700. The UE 700 may be configured to update the gathered and stored base station reference data to achieve an adequate level of accuracy, for example if the base station reference data changes, which may occur, for example, if a given base station moves.

When at least three different sets of base station reference data are gathered, the UE positioning logic 1240 may calculate the UE position. If more than three base stations are available, meaning in this example that 3G/LTE/5G signals with TOA data have been received at the current position, the UE positioning logic 1240 may evaluate different base station constellations to choose the most optimal constellation. If an operational application is foreseen, the UE positioning logic 1240 may trigger the RRC_CONNECTED state to deliver the calculated UE (X, Y, H) position, and any associated data, to the UE positioning system 730 for further processing. When the RRC_CONNECTED state is established, the UE 700 may receive a Timing Advance (TA) correction value 1284 provided by a base station, in this case the first base station 801, which TA correction value is required for proper synchronization to the network 1200. The TA correction value 1284 corresponds to a distance travelled by a microwave signal between the base station antenna and the UE 700. The UE verification logic 1250 may use the TA correction value 1284 and compare it with the TOA-based distance (D) to the base station so measured. Although the two values are obtained differently, they should substantially match if the TOA position was calculated correctly. Additionally, the UE positioning logic 1240 may take into account potential multipath propagation and its impact on the TA correction value 1284.

The UE 700 may also report its TOA-based position, together with additional data useful for a second verification by UE positioning system 730. One or more positioning reports 1285 may be received by a base station 801 in the RRC_CONNECTED state, which base station may forward this data together with additional, base station related data for further verification. The base station 801 may add to the UE positioning report, inter alia, the RRC connection status of the given connection with the UE 700, the base station identifier and the TA correction value 1284 used in this connection. The purpose of this additional data is to provide enhanced verification, as this data was not provided by any radio interface. It may also mean that this data cannot be recorded or intercepted by any eavesdropping device or system, nor used for spoofing or modification of UE positioning reports 1285. Once the UE positioning system 730 receives a complete set of TOA-based data, including data required for verification, it may perform a final verification and confirm that the UE 700 is real or not real. Additionally, UE tracking may be applied at this level, which means that outputted data from this system may be used operationally, for example by the end user system 740.

Figure 13:
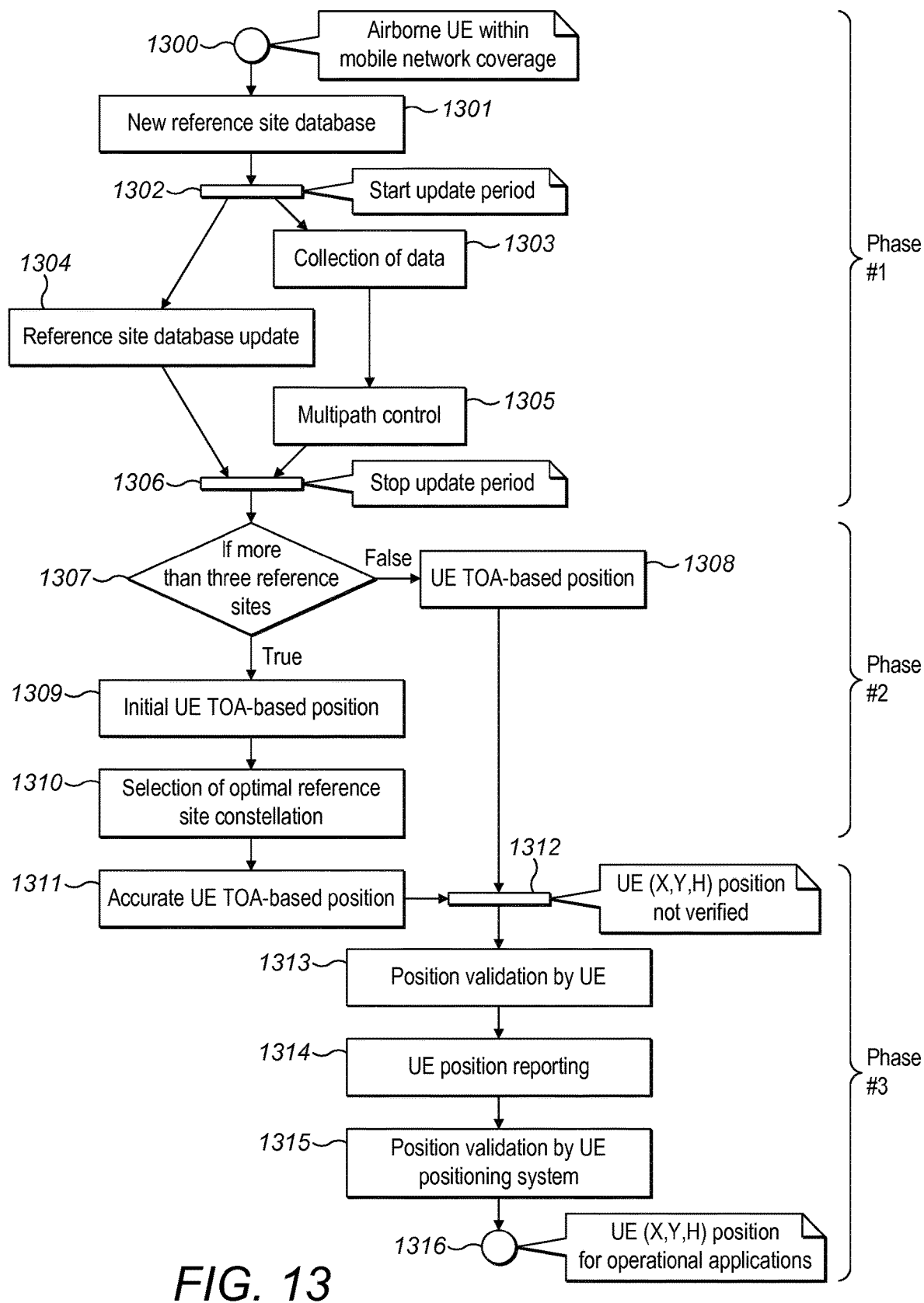
FIG. 13 is a flow diagram showing processing operations according to some example embodiments.

FIG. 13 is a flow diagram showing operations that may be performed at the UE 700 in accordance with one or more example embodiments. It will be appreciated that variations are possible, for example to add, remove and/or replace certain operations. The operations may be performed in hardware, software or a combination thereof. The operations may be divided into three phases for ease of explanation. The first phase (Phase #1) may be referred to as provision of the reference site database, wherein the reference sites are base stations in this example. The second phase (Phase #2) may be referred to as determination of the UE position (X, Y, H). The third phase (Phase #3) may be referred to as verification of the UE position.

Figure 14:
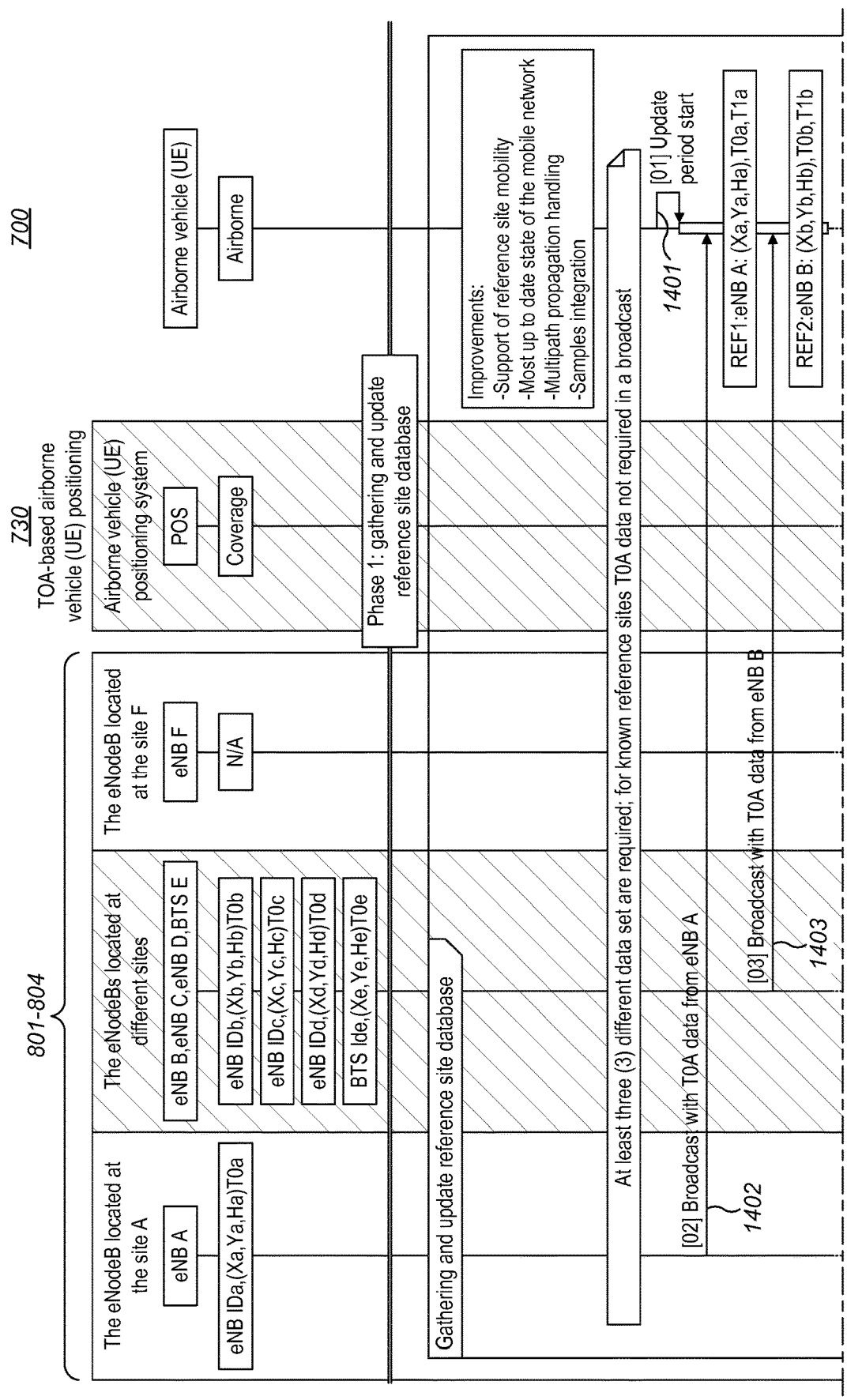
FIG. 14 is a flow diagram showing in greater detail processing operations according to some example embodiments.
Figure 14:
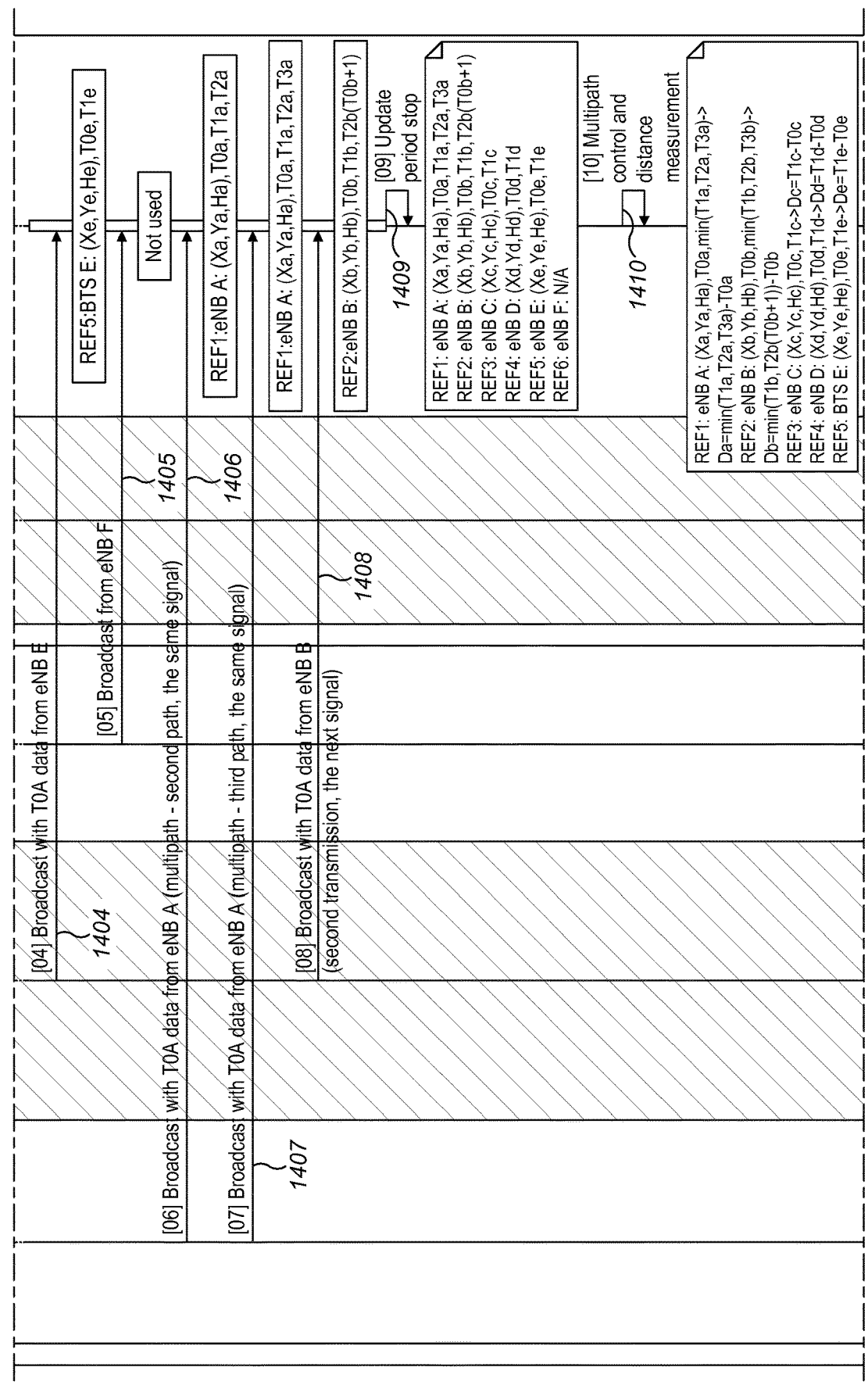
Figure 14:
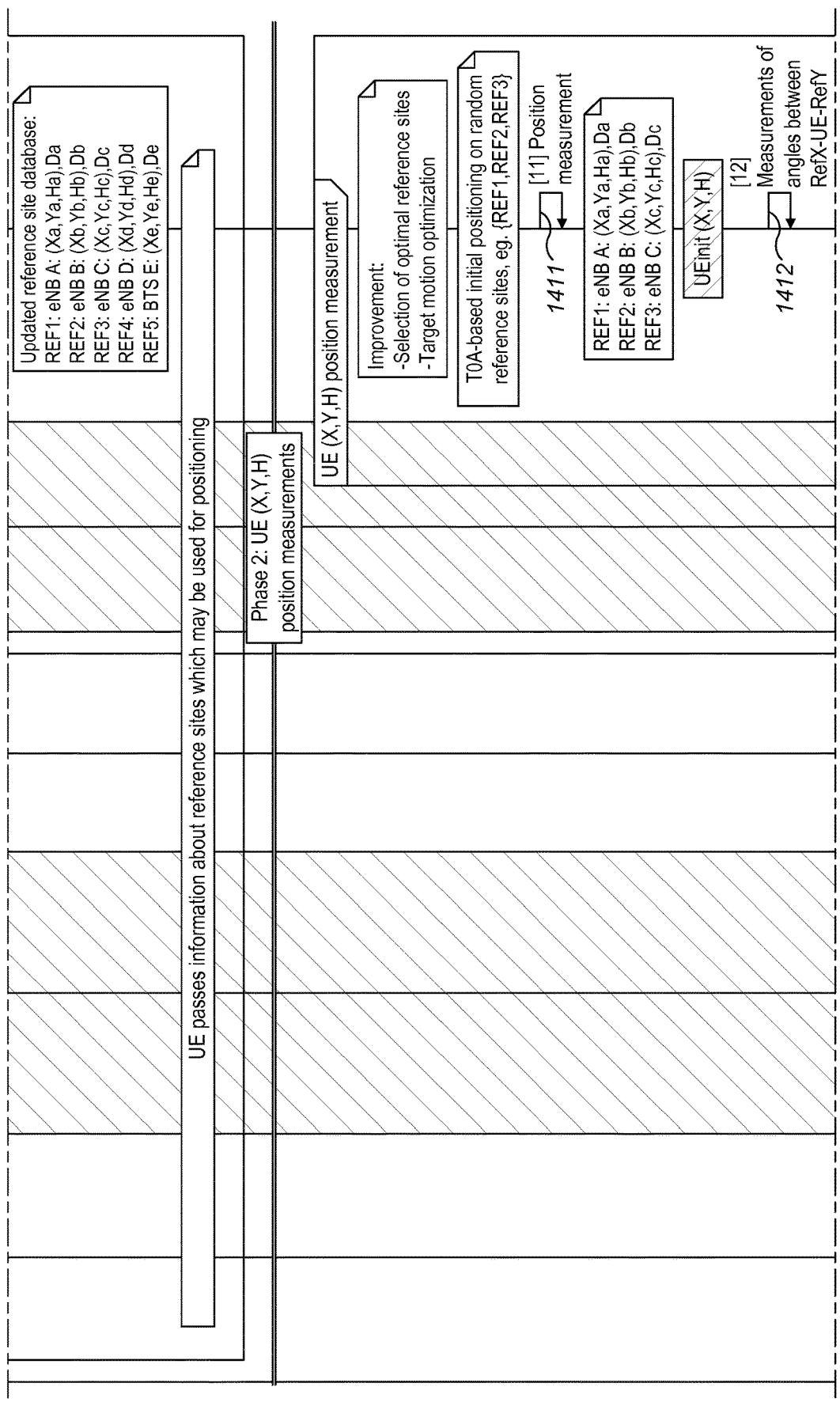
Figure 14:
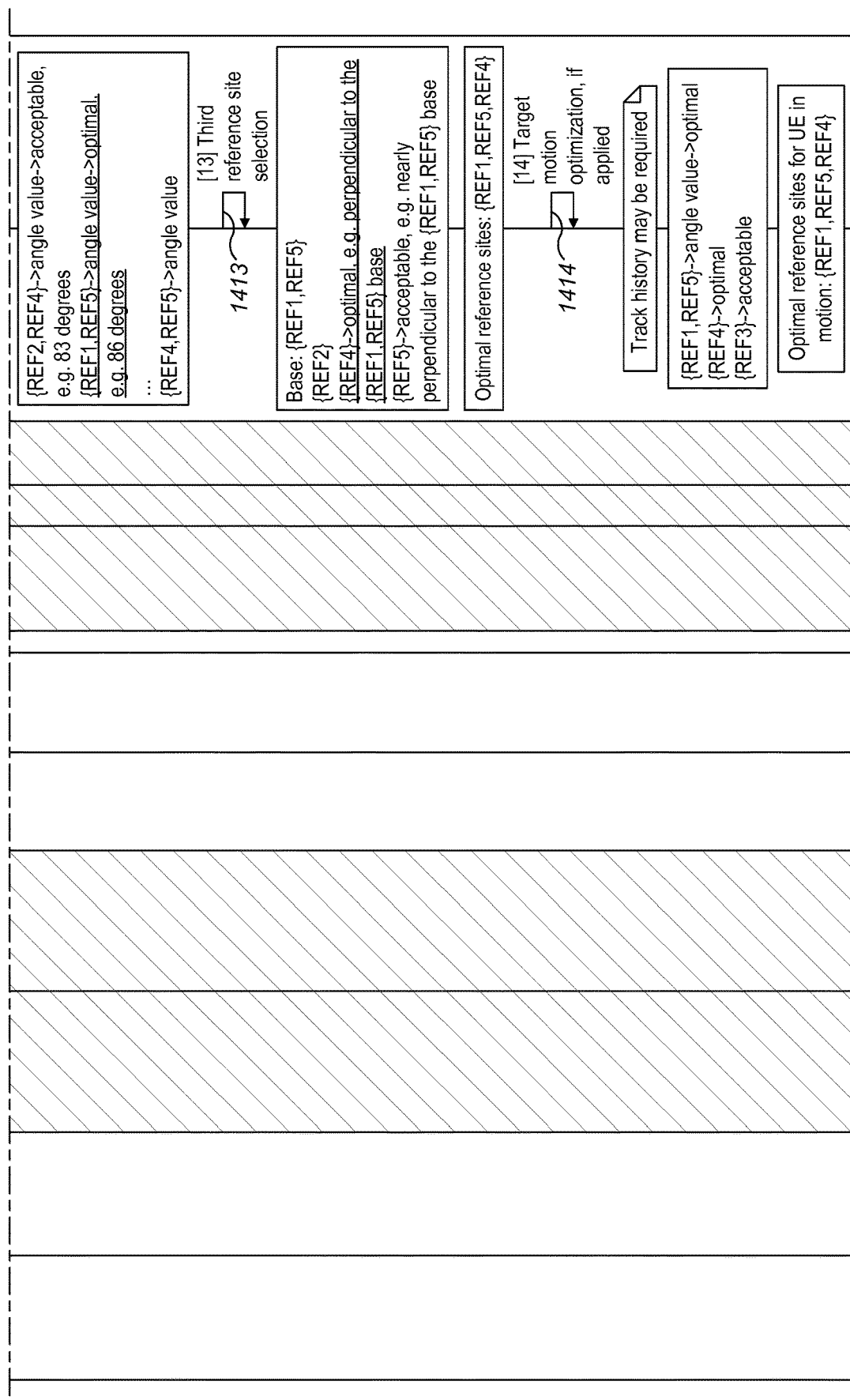
Figure 14:
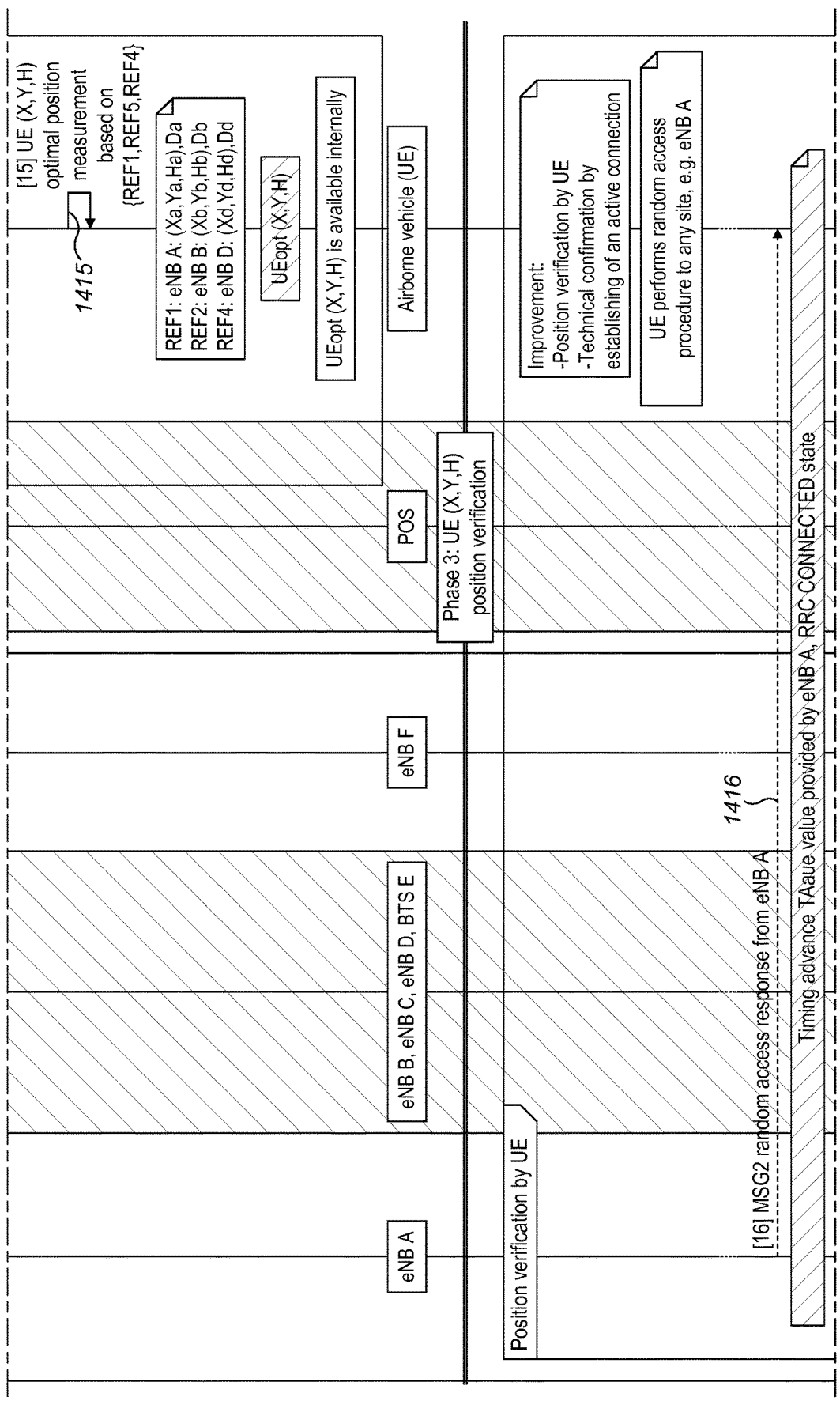
Figure 14:
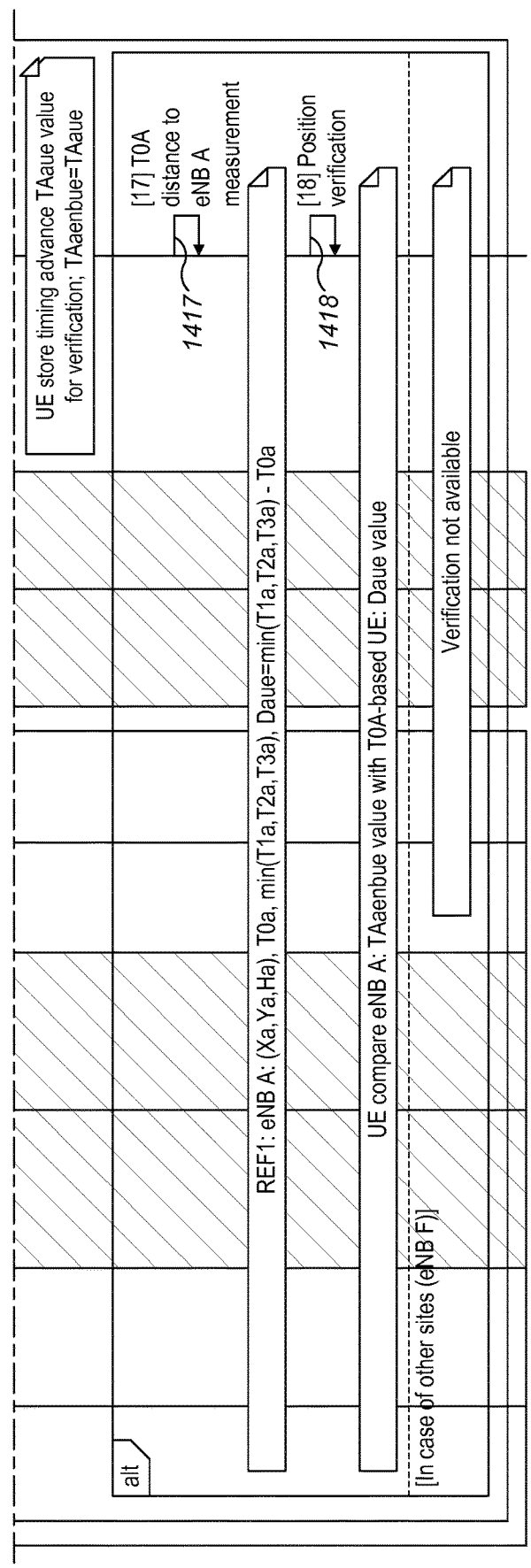

FIG. 14 is a detailed signal timing diagram of example data messages that may be exchanged between the UE 700, the positioning system 730 and various base stations 801-804 of the mobile network 1200.

Phase #1—Provision of Reference Site (e.g. Base Station) Database

Referring to FIG. 13, a first operation 1300 may comprise the UE 700 being set to an airborne state or generally in need of TOA positioning, for example if GNSS positioning fails, and the UE is within coverage of the network 1200. Another operation 1301 may comprise initiating a new reference site database 1220, if one is not already available for this mobile network 1200. An update period may be initiated in an operation 1302.

The purpose of the update period will become clear later on. The UE 700 may start gathering the base station reference data at operation 1303, from any base station 801-804 detected by the UE. The base station reference data may comprise:

eNB ID—an identifier of the base station;
eNB ID (X, Y, H)—coordinates of the antenna system of this base station;
$T_0$—the signal transmission time (which may be per frame, subframe or symbol).

For each received set of base station reference data, the eNB ID may be a unique identifier used to identify/index the other reference data. If a given base station of the particular mobile network does not support the TOA method, its presence may still be recorded and stored in the UE database 1220.

For those broadcasts or transmissions for which the UE 700 has already stored base station reference data, the UE 700 may still perform an updating operation 1304.

After the UE 700 has acquired base station reference data from a given base station, it may latch the signal reception time $T_1$, as outlined previously for TOA positioning methods, and this value may be added to the reference site database 1210, against the relevant eNB ID.

In an operation 1305, multipath control may be applied to the collected base station reference data. In this respect, the UE 700 may in some cases receive more than one copy of the same signal, having respective delays. In such cases, the delayed signal reception times $T_2$, $T_3$, $T_4$ etc. may be stored and added to the collected base station reference data for the relevant eNB ID. Additionally, or alternatively, it is possible to receive a subsequent set of base station reference data for a given eNB ID in the same update period. The UE 700 may be configured to determine whether this relates to a multipath issue, or is the next signal, based on the time separations between two consecutive signals and its natural spacing. For example, in the case of LTE, the spacing is 10 ms for frames, and 1 ms for subframes etc. The update period may be a configurable period, taking into account the required update rate of positioning reports, which may be one per second. It may be assumed that the update period may be set at or about 500 ms. During this update period, the UE 700 should be able to collect and update base station reference data for at least three base stations for TOA positioning. Three base stations are required for 3D positioning and hence this is what is assumed to be the required minimum in example embodiments herein. As a further justification of an update period of 500 ms, when SIB16 is employed, it may be updated with a defined update rate of, e.g. 40-100 ms, which confirms that 500 ms may be enough to gather the required sets of base station reference data. The UE 700 may use any available broadcast or transmission from the given base station, because synchronisation will be guaranteed by PSS/SSS (in the case of LTE) or another form of synchronisation signalling, typical for other communication standards.

The operation 1305 of multipath control may be performed by using the minimal received value from the set of signal values $T_1$, $T_2$, $T_3$, $T_4$, etc., i.e. $\min(T_1, T_2, T_3, T_4, \ldots T_{0+1})$, where $T_{0+1}$ indicates reception of the next transmission from the same eNB. A justification for this selection is that the minimal value should correspond to the line-of-sight signal, given signal propagation, if such a direct signal were received. This may be useful for TOA-based positioning, because the time difference $T_1-T_0$ is used for TOA distance measurements. The UE 700 may measure the distance D to the given base station based on equation: $\min(T_1, T_2, T_3, \ldots, T_{0+1})-T_0$.

At a subsequent operation 1306, the update time ends, and the UE 700 should have a list of updated base station reference data. The multipath control operation 1305 mentioned above, can be performed at this time.

To summarise, the phase #1 operations 1300-1306 provide support for the mobility or changing of base station parameters, for data updating, multi-path control and sample integration.

Referring to the timing diagram of FIG. 14, phase #1 is represented by operations 1401-1410. Operation 1401 may comprise starting the update period. Operations 1402-1405 may comprise broadcasting ToA data from respective base stations (eNB) to the UE 700. Operations 1406 and 1407 represent multipath propagation in which the UE 700 may receive more than one copy of the same signal, which may include some delay. Operation 1408 represents the next broadcast of TOA data from one of the base stations to the UE 700. Operation 1409 may comprise the end of the update period. Operation 1410 may comprise performing multipath control and distance measurement.

Phase #2—Determination of the UE Position (X, Y, H)

Referring back to FIG. 13, in phase #2, the UE 700 may calculate its UE (X, Y, H) position based on the received and updated base station reference data, taking into account any multipath corrections.

As will be appreciated, how to calculate the UE (X, Y, H) position depends on the number of available base stations. Two different base stations are required for 2D (X, Y) positioning, or when the height H is known, or three different base stations are needed for 3D positioning (X, Y, H). Accordingly, in an operation 1307, it is determined if more than three base station sites are referred to in the reference site data 1220 in the base station database 1210. If not, in an operation 1308, TOA-based positioning may be performed.

If more than three base stations are available, an optimization of UE (X, Y, H) positioning may be applied, taking into account the above-mentioned principles. In an operation 1309, the UE 700 may calculate its UE (X, Y, H) position calculation using three base stations, i.e. using the same principles as in basic TOA-based positioning. The selection of three base stations may be a random selection, because the purpose of this operation is to determine an initial UE position $UE_{init}(X,Y,H)$ to optimize in one or more subsequent operations. $UE_{init}(X,Y,H)$ may be calculated with the same accuracy as in a basic TOA positioning method.

Figure 15A:
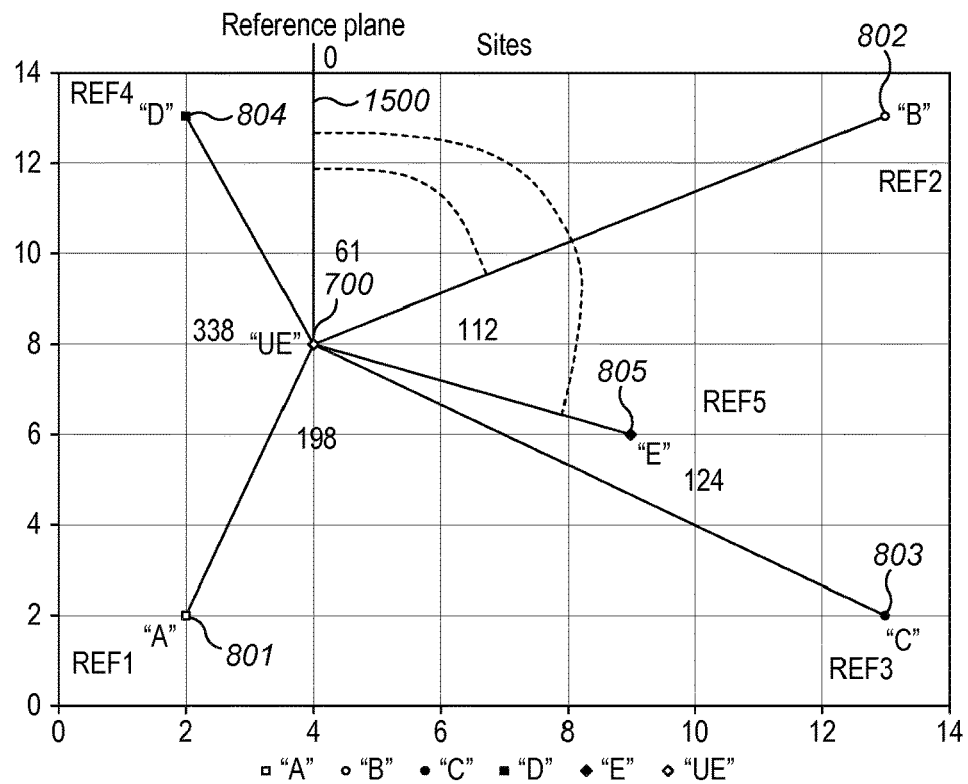
FIGS. 15A-B are grids representing the position of a target, shown in FIG. 7, in relation to a plurality of base stations, for determining an updated position according to some example embodiments.

Subsequently, an operation 1310 of selecting an optimal base station constellation is performed. As indicated in FIG. 15A, which is based on FIG. 8, this may comprise measuring the angle between a reference vector 1500 from the UE 700, e.g. static-North from the UE, and respective vectors extending from $UE_{init}(X,Y,H)$ to the position of each given base station 801-805. Angles between each pair of base stations 801-805 with respect to $UE_{init}(X,Y,H)$ are calculated in order to determine an optimal pair of base stations, called a base pair, for which the intersection of range rings (where D represents its radius) are optimal in accordance with the observations described with reference to FIGS. 2A-2C. As mentioned, for an angle equal to 90 degrees (see FIG. 2B) the intersection area is minimal. In practice, such an intersection occurrence may be rare, so a criterion may be proposed whereby angles between 60-120 degrees are considered acceptable, at least initially. The final decision on acceptable angles may require field measurements and may also depend on the number of available base stations and their density in the given area. In a proposed method, a sin(angle) value is used as a reference, and a first criterion:

$$\sin(60 \text{ degrees}) = 0.86603. \tag{1}$$

is given as a lower threshold and the same derivation made for an upper threshold of 120 degrees.

Thereafter, a pair of base stations 801-805 with highest sin(angle) value, e.g. 1, may be used as an optimum base pair, whereas other pairs which meet threshold criteria may also denoted as acceptable. It is observed from FIG. 15A that the angle for A-UE—E has a value of approximately 86 degrees, which gives the highest corresponding sine value from any of the pairs of base stations. Hence this pair (A, E) may be used as the base pair for subsequent calculations.

In order to adapt the equation [1] criterion for real-world scenarios, the criterion may be slightly relaxed to allow more combinations in a subsequent optimization step. For example, a 10% tolerance may be proposed, which means that any other base station combinations which have an output result within limits denoted by the following equation [2] may be also considered acceptable:

$$\sin(\text{angle}) >= 90\% * \sin(\text{optimal angle}). \quad [2]$$

For example, using a base of base stations A, E, this base is used for selection of a third base station, for unambiguous or optimised positioning and for determining the 3D UE (X, Y, H) position. The third base station may be determined based on its relative position to the base pair A, E. The preferred position of the third base station should be in the middle of a base angle for vectors of a base pair. In this example, the fourth base station D 804 is determined as optimal as its opposite vector is within the angle between the base pair A, E. Less favourable base stations may be considered as acceptable in some circumstances.

Figure 15B:
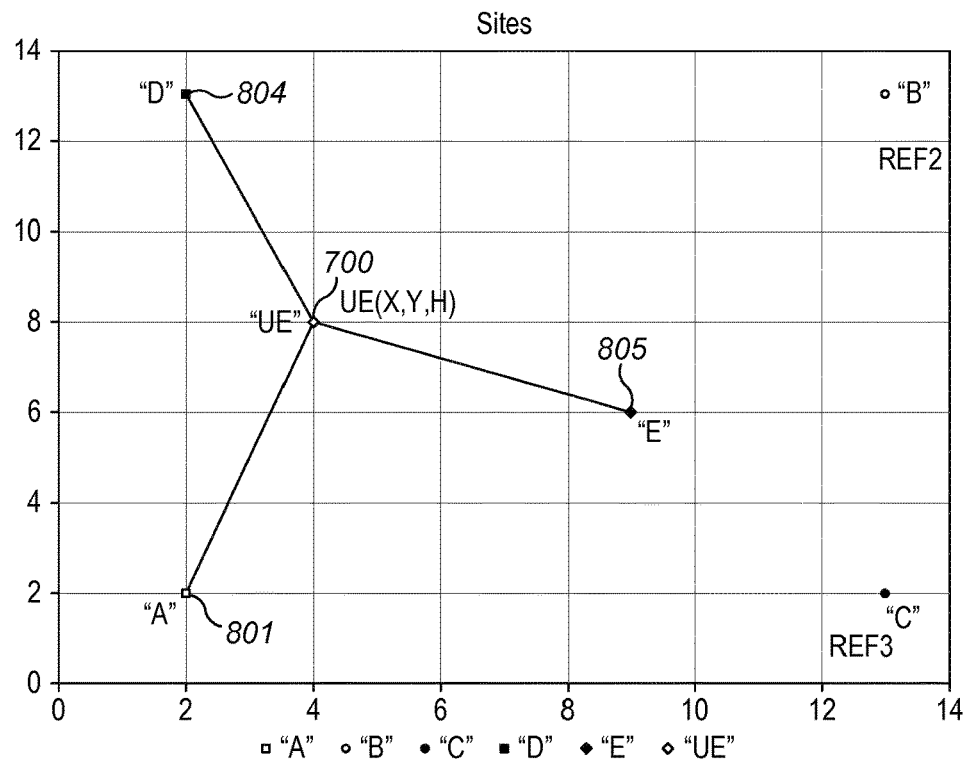

Hence, as indicated in FIG. 15B, three base stations 801, 804, 805 (A,E,D) may be selected which create an optimum base station constellation for the UE 700 at its current position.

The co-ordinates of these three base stations 801, 804, 805 may be used to determine an optimised position $UE_{opt}$ (X,Y,H) using TOA-based distance measurements $D_a$, $D_e$ and $D_d$ in the manner described above.

It should be noted that the above is merely an example derivation of the optimal set of base stations, and there may be more optimal constellations dependent on geographic criteria. Additionally, if necessary, less-favourable base station constellations may be used instead of the most optimal ones.

In some example embodiments, the type of base station and indications of multipath propagation may be used as an additional criterion or criteria for selection, when necessary.

Figure 16A:
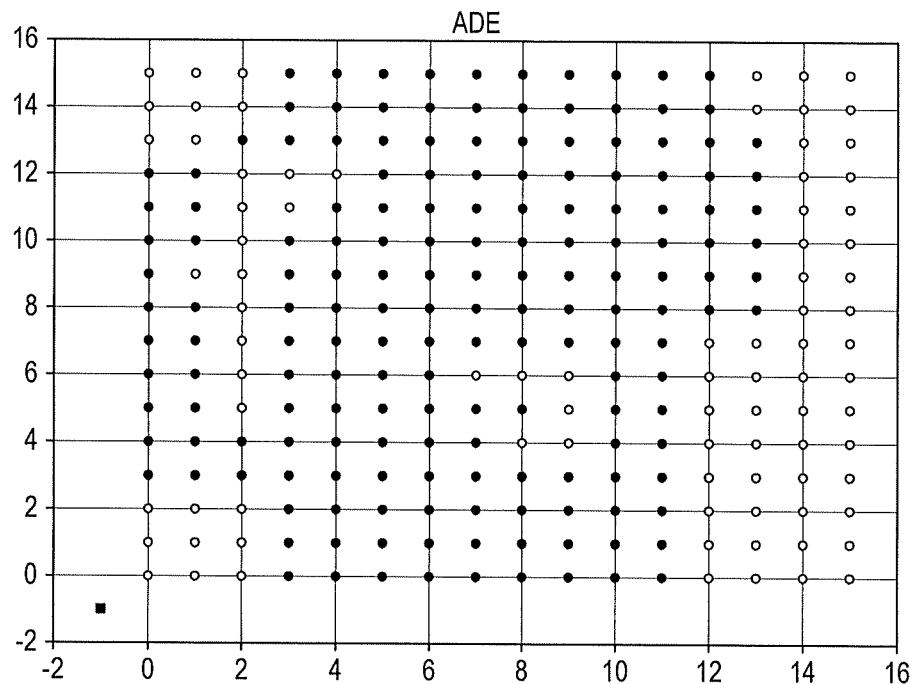
FIG. 16A is a grid representing possible positions of the FIG. 7 target for which selected base stations may be determined as optimal for positioning, according to some example embodiments.
Figure 16B:
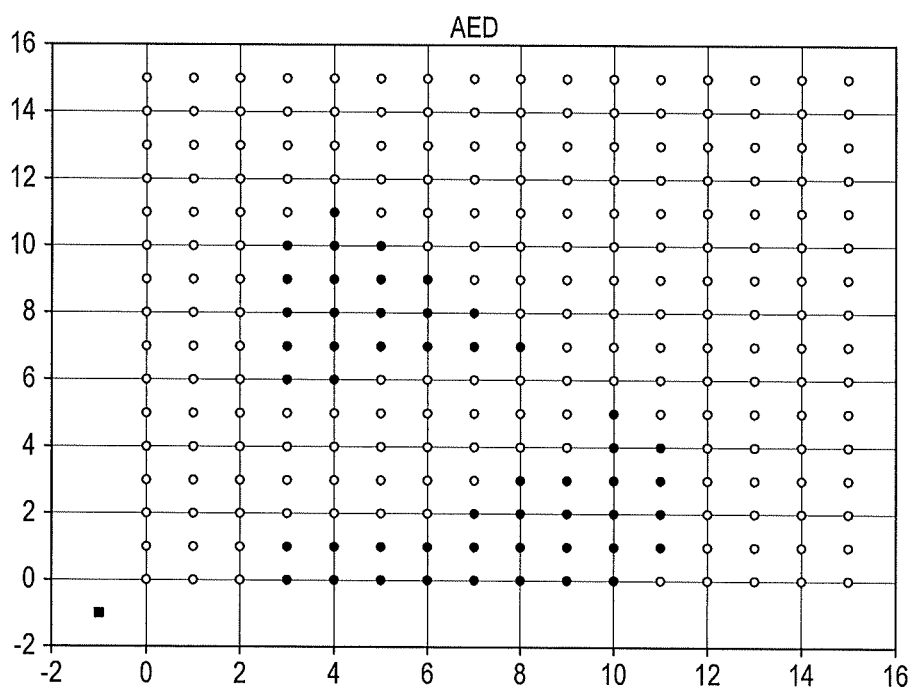
FIG. 16B is an alternative grid representing possible positions of the FIG. 7 target for which selected base stations may be determined as optimal for positioning, according to some example embodiments.

FIG. 16B shows other potential positions of the UE 700 for which the constellation of FIG. 15B may be optimal, as indicated by the solid dots. This constellation may be referred to as A,E,D where the first and fifth base stations 801, 805 (A, E) represent the base pair and the fourth base station 804 (D) represents the third base station, appropriate to the base pair. FIG. 16A shows an alternative to that of FIG. 16B, this time for the constellation A, D, E, where the first and fourth base stations 801, 804 (A, D) represent the base pair and the fifth base station 805 (E) represents the third base station, appropriate to the base pair. It follows that different constellations may be optimal based on a current UE position, but some may be optimal for different numbers of other positions. In each case, a better or the best available configuration or constellation of base stations may be proposed in order to update the initial UE position $UE_{init}$(X,Y, H) based on TOA measurements or by any other means. If $UE_{init}$(X,Y,H) was completely inaccurate, additional position recalculation may be applied with $UE_{opt}$ (X,Y,H) position.

Referring still to FIGS. 16A and 16B, areas of common constellations may be identified, such that when other UEs are located nearby, the same constellation may be used for positioning of those UEs in order to compensate and/or minimize measurement areas, because the same base stations will be used. Usage of the same reference site constellation is also beneficial when a distance separation between two or more UEs nearby is required as common position error distribution may be applied.

FIGS. 15 and 16 are appropriate and useful for understanding example embodiments for statistic situations, where the UE 700 is not moving, or moving relatively slowly.

Figure 17A:
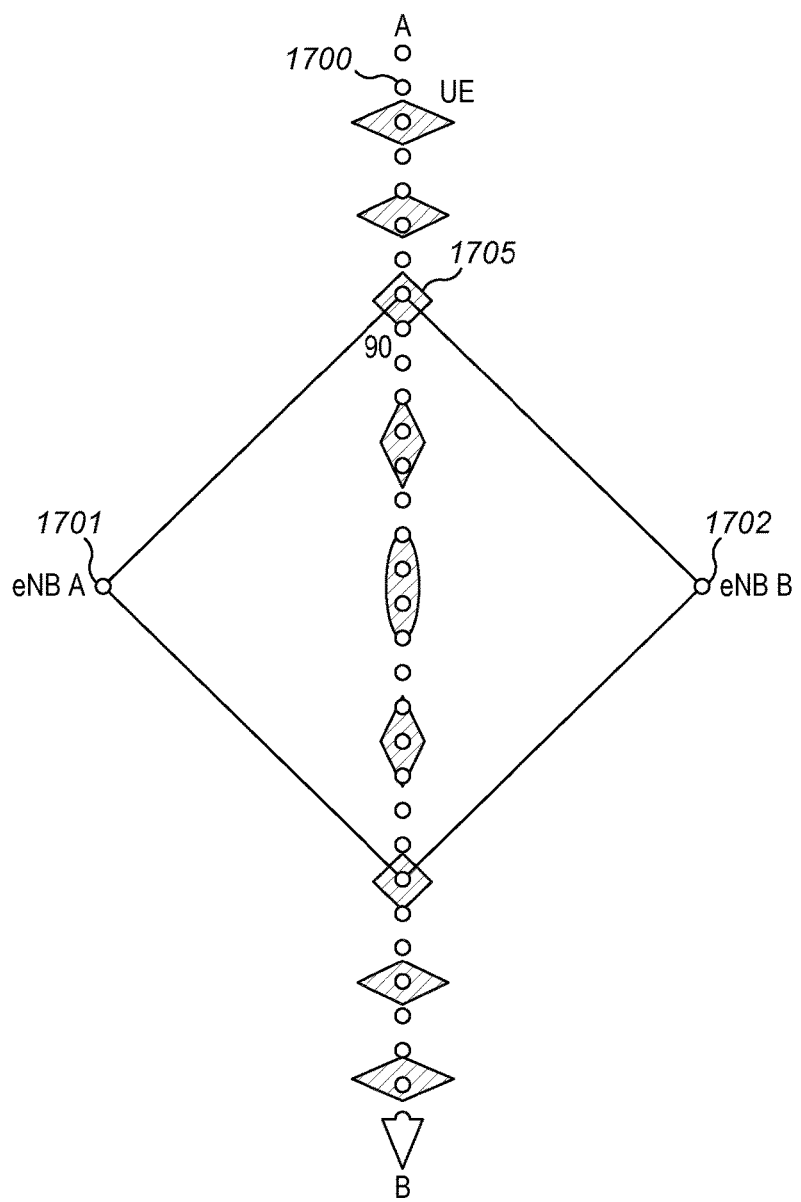
FIG. 17A is a schematic view of a moving target with respect to two base stations, indicating ambiguity areas, and useful for understanding some example embodiments.

However, consider now the case where the UE 700 is moving more quickly, as may be the case for an airborne vehicle. FIG. 17A shows a UE 1700 moving in a relatively straight line from point A to point B in relation to first and second base stations 1701, 1702 (A, B). It may be seen that the shape of the intersection area 1705 related to the first and second base stations 1701, 1702 is symmetrical and also changes with the known pattern, described with reference to FIGS. 2A-2C.

Figure 17B:
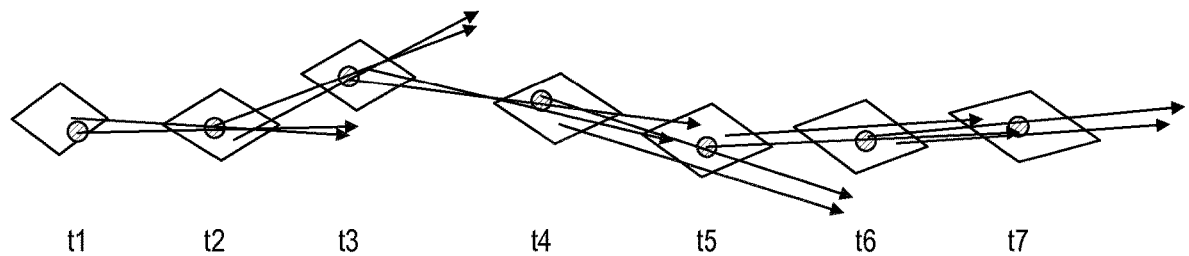
FIG. 17B is a schematic view of how the moving target in FIG. 17A may be tracked.

In this case, the UE positioning logic 1240 may decide to take into consideration UE motion to provide more accurate positioning data $UE_{opt}$ (X,Y,H). To do so, the UE 1700 may need to determine its speed and a heading vector. One method for determining the speed and heading vector is to measure three consecutive $UE_{opt}$ (X,Y,H) position reports. Alternatively, or additionally, such data may be provided from other sources such as a flight plan. For confirmation purpose, some averaging period may be proposed to minimize the path fluctuations, which may have impact on UE heading measurements. As illustrated in FIG. 17A, a longer axis of the intersection diamond is in line with UE heading vector, which means that accuracy may be lower in this direction. However, at the same time, there may be less deviation in the perpendicular direction of the UE heading vector. Such a scenario may be beneficial from an operational system's point of view, as illustrated on FIG. 17B. The value of this modification is that operational systems are more sensitive to an indication that the UE 1700 has changed its flight direction (i.e. its heading), possibly indicating the start of a manoeuvre. If a one-minute vector is used, as may be typical, even a small deviation from current UE heading may be identified and, based on such an identification, operational system logic may trigger some additional actions, such as activation of safety net protocols, where based on such an identification, a risk of collision may be identified.

However, a lower accuracy in the error distribution of the heading direction may have lower impact on data operational applicability. An operational system may predict a future UE position based on tracking historical data and UE speed, e.g. 60 seconds ahead. Lower accuracy means that such measurements may have lower accuracy, but may still be compensated by using a longer prediction time period, e.g. 65 seconds ahead. In this case, the risk is associated with prediction of time to collision alert. A more severe situation is when deviation from the path is considered, as the potential impact on other traffic may be much higher. Additionally, the heading direction is usually continuously monitored by a user or on-board equipment, and so the presence of other traffic within this area will be easy to detected.

Example embodiments may support this concept by modification of a base station selection criterion or criteria.

Referring to FIGS. 18A-18D, the criteria for selection of the base pairs of base stations may be reduced to permit more combinations into a subsequent selection operation. For example, in addition to selecting the best base pair of base stations meeting the equation [1] criterion, a 10% tolerance margin may be used, meaning that other base station pairwise combinations having an output within limits defined in equation [2] may provide a narrowed-down set of pairs.

Figure 18A:
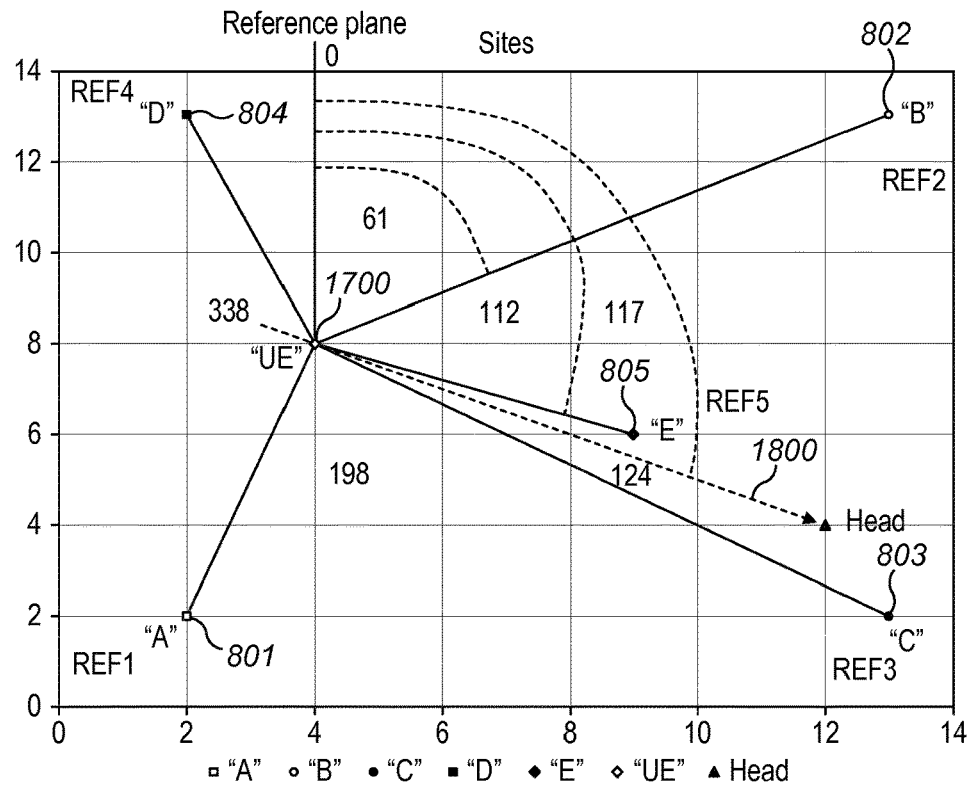
FIG. 18A-D are grids representing the position of a moving target in relation to a plurality of base stations, for tracking the position of the target, according to some example embodiments
Figure 18B:
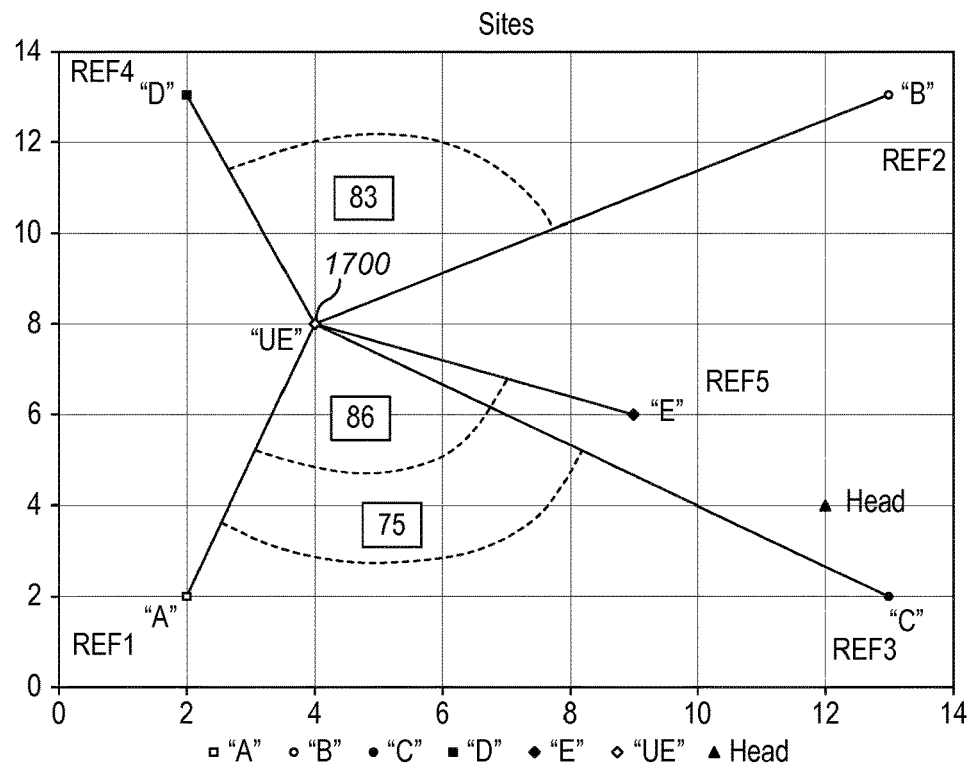

As illustrated in FIG. 18A, which is similar to FIG. 15A, a heading vector 1800 is now shown. Referring now to FIG. 18B, in addition to the previously-determined optimal angle (86 degrees) for the shown set of base stations 801-805, two other angles meet the criterion set out in equation [2] and another, optional criterion set out as equation [3]:

$$\text{angle} >= 70 \text{ degrees.} \qquad [3]$$

These acceptable angles are 83 and 75 degrees.

As in may be seen, the equation [3] criterion is higher that criterion used in base selection i.e. equation [1], but equations [2] and [3] may be applied together to give the opportunity to analyse a limited group of potential base stations for further analysis from a high number of possible combinations.

Note that angles higher than 120 degrees may be still excluded from the analysis, as sin(60 degrees)=sin (120 degrees) and the equation [1] threshold is applied. This may be justified in order to not allow too much uncertainty in the direction of the heading, which should be within defined limits.

In general, any of the proposed criteria set out in equations [1], [2] and [3] may be configurable and adaptable to real deployment scenarios.

Figure 18C:
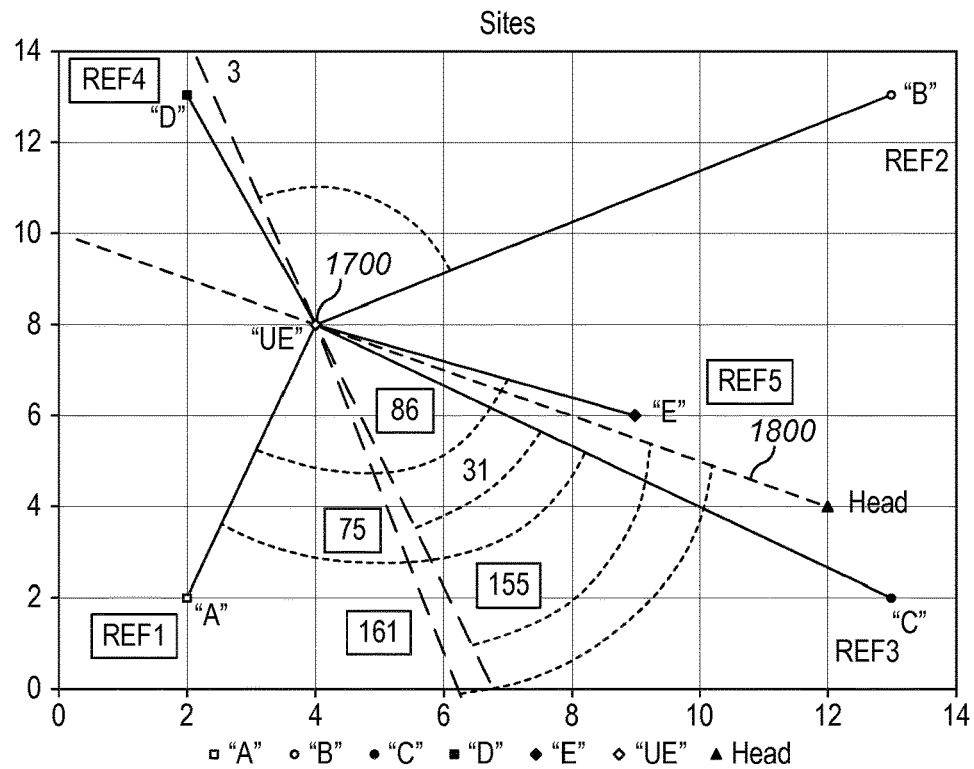
Figure 18D:
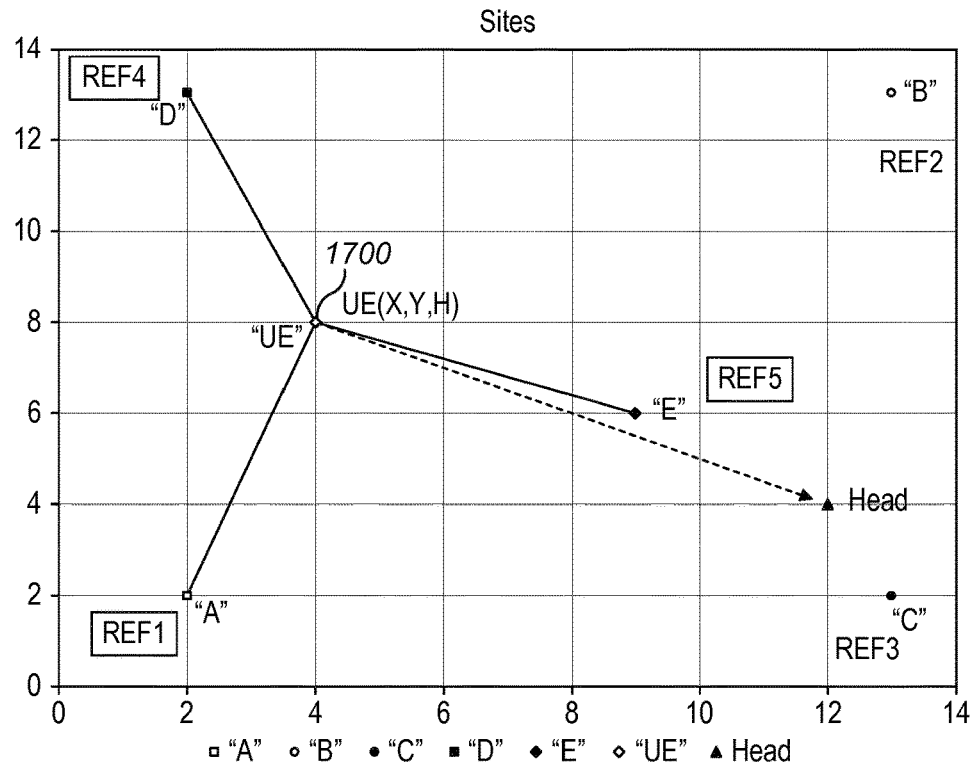

Referring now to FIG. 18C, motion of the UE 1700 is handled with the requirement that the UE heading vector 1800 should be between the vector arms of a given angle meeting the equation [2] and equation [3] criteria. Then, a minimum angle value is determined to select an optimum base pair of base stations 801-805. In this example, the first and fifth base stations 801, 805 (A,E) may still be used as a base pair, as the distance from the centre of the A-UE—E angle is closest to the UE heading vector 1800. As the base pair of base stations 801, 805 (A,E) is set, a third base station may be determined with the same logic as in previous case, whereby the opposite vector should pass through the angle, which is shown in FIG. 18D whereby the third base station 804 (D) is selected. FIG. 18D therefore shows a selected base station constellation for the UE 1700 in motion towards the point "head" at position (12, 4).

Figure 18E:
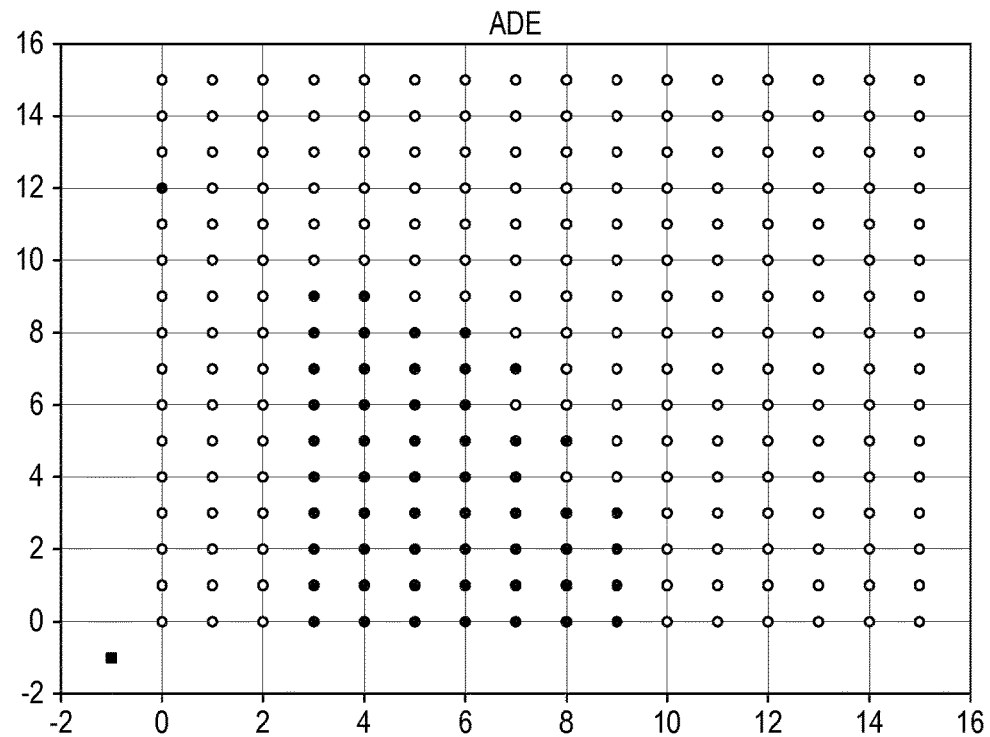
FIG. 18E is a grid representing possible positions of the moving target for which selected base stations may be determined as optimal for positioning, according to some example embodiments.
Figure 18F:
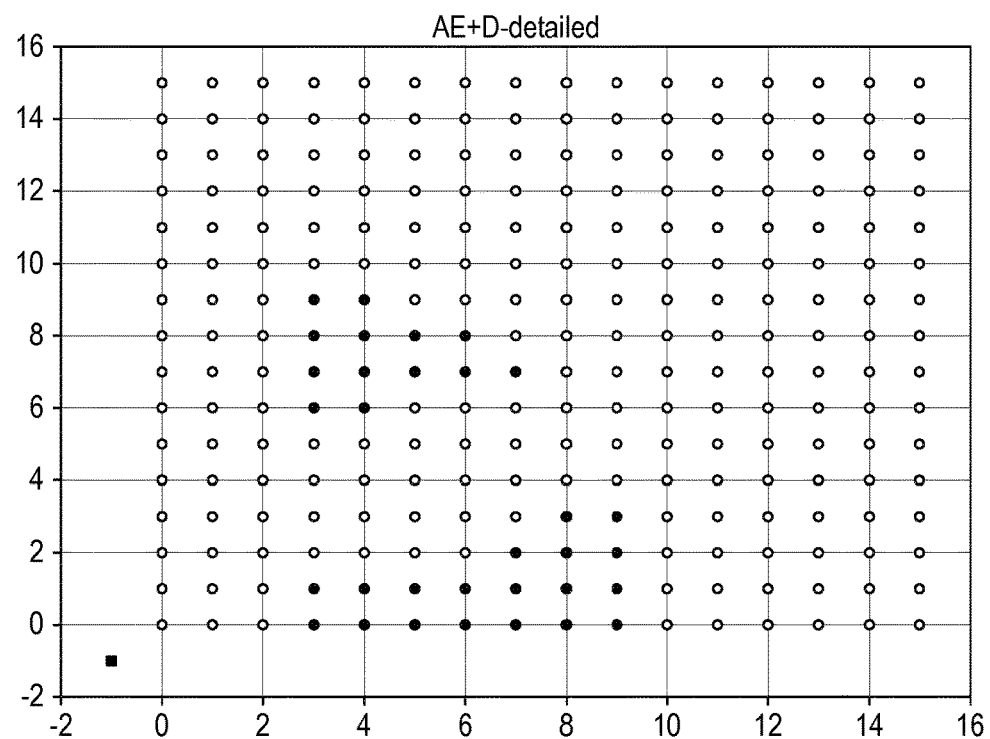
FIG. 18F is an alternative grid representing possible positions of the moving target for which selected base stations may be determined as optimal for positioning, according to some example embodiments.

Referring to FIGS. 18E and 18F, other potential positions of the UE 1700 may be identified, for which the "ADE" constellation will be optimal when the UE is in a motion towards the "head" point. As may be seen, the provided subset of solid dot positions is smaller with respect to the corresponding FIG. 16A, 16B examples for the static UE case, which means that selecting an optimal set of base stations 801-805 for a moving UE is more complex when compared to the static situation.

For specific types of moving UEs, such as trains or trams, where TOA-based positioning may be requested based on GSM/LTE/5G technology, additional improvement may be achieved in terms of the number of base stations 801-805 required and the measurement accuracy. As may be seen in FIG. 19A, a UE 1900 (attached to a train or tram) in normal operations cannot be located outside of the line extending between positions A and B, meaning that one dimension is stable. A third dimension (H) also may be omitted. It may mean that only two base stations 1701, 1702 may be required for TOA-based positioning, as shown in FIG. 19A. Additionally, the best accuracy required in this case, on an axis parallel to the heading vector, may be achieved for angles with small base (i.e. the distance between base stations 1701, 1702 with respect to the UE 1900 in motion. It means that such pair of selected base stations 1701, 1702 should be located near the path, e.g. the railroad, for better accuracy.

Figure 19B:
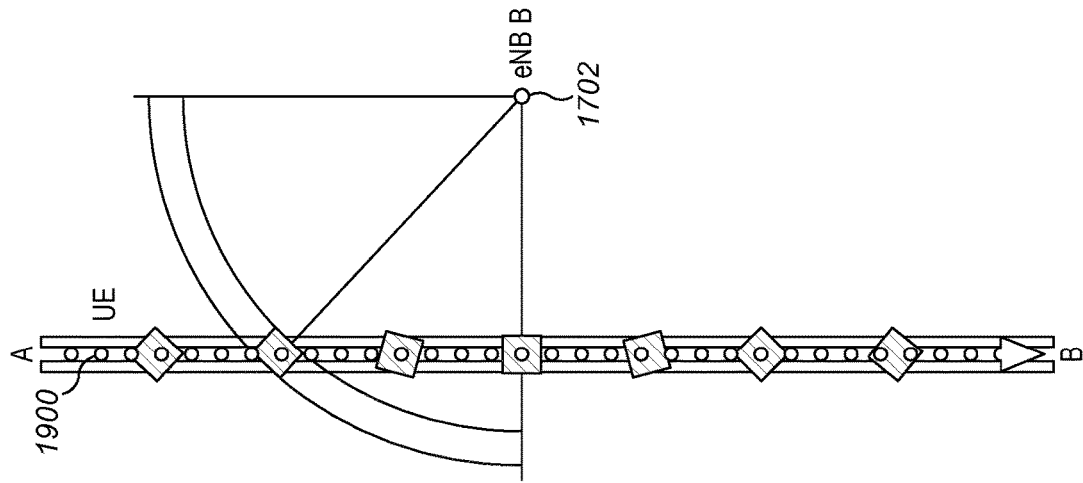
FIG. 19B is a schematic view, similar to FIG. 19A, showing the use of a sectorized base station antenna.
Figure 19A:
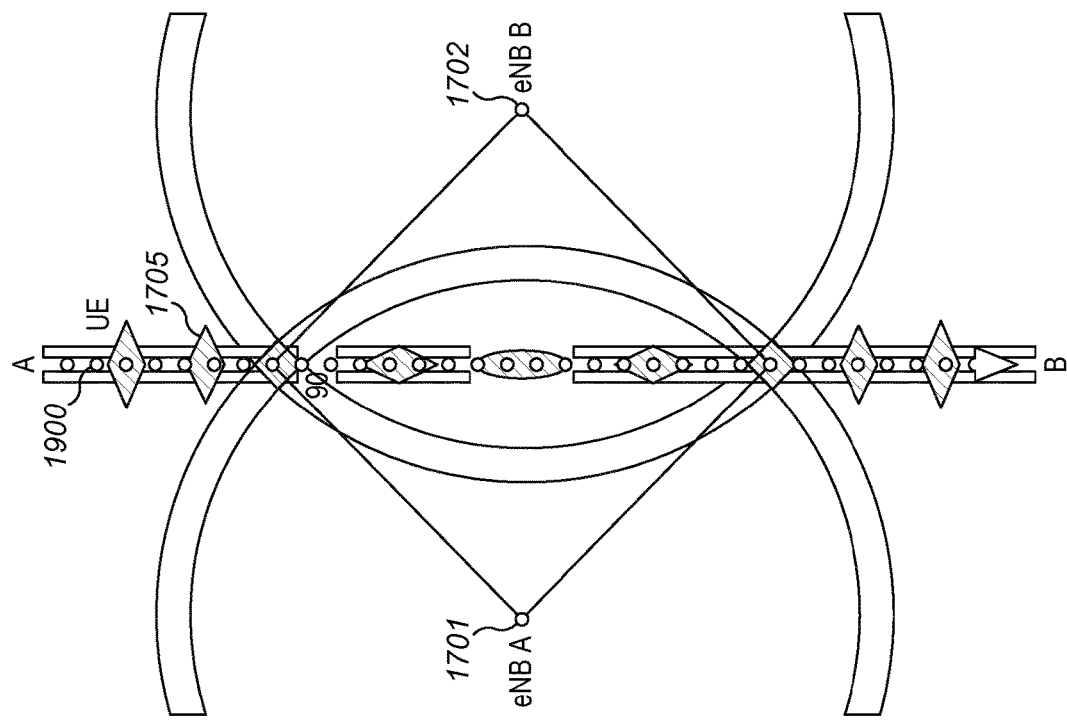
FIG. 19A is a schematic view of a moving train-like target with respect to two base stations, including ambiguity areas, and useful for understanding some example embodiments.

Moreover, as shown on FIG. 19B, a sectorized antenna may be used on the second base station 1702, in which case only one such base station may be required for TOA-based positioning for the UE 1900 in this type of linear motion, or when the UE moves a specified trajectory without deviation. As may also be appreciated, an error distribution in case when only one base station 1702 is used depends on the timing accuracy of the base station, which may be related to TOA To accuracy.

Possible applications may relate to the GSM-R communication standard for railways where UEs associated with a track-based vehicle may be used to provide an independent positioning source or for speed monitoring.

Summarizing, phase #2 makes it possible to determine an updated UE (X, Y, H) position based on TOA measurements.

Referring back to FIG. 13, in a first operation 1309, an initial position $UE_{init}(X,Y,H)$ is calculated. Then, if more than three base stations supporting a TOA method are available, in an operation 1310, a further optimization may be provided by selection of one or more optimum base station constellations for either a static and dynamic scenario. An improvement is provided using constellation geometry issues in the case of static UE position measurements (resulting in a minimal cross section area) and, in case of a moving UE, improvement is related to alignment of the cross-section area's longer axis to the heading vector and the minimization of uncertainly along, or perpendicular to, the heading vector. Thus, for operational applications, such provided data may have better quality and may minimize the number of false alerts due to prediction of future UE position. The updated, optimized position $UE_{opt}(X,Y,H)$ is provided in operation 1311.

Referring to the timing diagram of FIG. 14, phase #2 is represented by operations 1411-1415. Operation 1411 may comprise the UE 700 calculating its position using random base stations. Operation 1412 may comprise the UE 700 measuring an angle between a reference point (e.g. static North from the UE) and a given base station. Operation 1413 may comprise the UE 700 selecting a third base station. Operation 1414 may comprise the optional feature of applying motion optimisation. Operation 1415 may comprise calculating an updated, or optimal, position based on selection of optimal base station positions.

Phase #3—Verification of the UE Position

Referring back to FIG. 13, a technical verification of UE (X, Y, H) position may be provided in operations 1312 to 1315 of the method shown in FIG. 13.

At the stage of operation 1312, it may be necessary that the UE 700 is switching to, or remaining, in the RRC_CONNECTED state and delivering its positioning data to the positioning system 730. Technical verification of the UE (X, Y, H) position may comprise verification by the UE 700 itself, and by the positioning system 730.

For verification at UE-level, the UE verification logic 1250 is employed. This operation 1313 may involve, for example, the UE verification logic receiving TA values 1284 ($TA_{AUE}$) from, in this example, the first base station 801 as a part of a RRC synchronization process. The first base station 801 in this process may be selected internally by UE logic with no restrictions and the $TA_{AUE}$ value is compared with the TOA-based distance Da to the first base station 801. If the base station to which the UE 700 is in a RRC_CONNECTED state does not support TOA-based positioning, the TA value cannot be used as a verification means unless the UE is aware of the exact base station antenna position coordinates. If the antenna position is known, e.g. delivered or obtained from another trusted source, the TA value may be used for UE (X, Y, H) position verification. If the base station 801 to which the UE 700 is RRC_CONNECTED supports TOA-based positioning, an obtained TA value ($TA_{AUE}$) is compared with the TOA-based distance Da to the given base station. Additional Da measurements may be performed or a value from the updated database 1210 may be used.

For example, GSM TA accuracy is 500 m and LTE TA is 78 m. In both cases, an expected accuracy of TOA-based UE positioning, as described herein, should be better, for example approx. 30m, which may be a subject of configuration.

Figure 20:
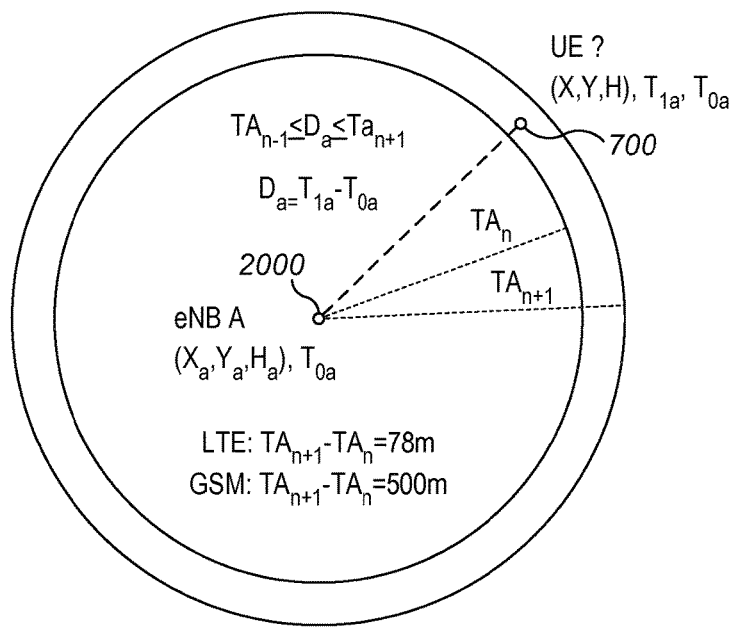
FIG. 20 is a schematic top-plan view of a target in relation to a base station, including a range ring associated with the base station, useful for understanding how the position of the target may be verified according to some example embodiments.

Referring to FIG. 20, if the distance Da to a given base station (eNB A) 2000 having a corresponding TA value ($TA_{AUE}=T_{An}$) (provided by the base station) substantially matches a TOA-based distance $D_a$ ($D_a=T_{1a}-T_{0a}$) measured independently by the UE 700, then that UE (X, Y, H) position may be successfully verified. A justification is that the UE 700 may not establish a wireless connection if a wrong or inadequate TA value was received as a result of bidirectional UE—base station communications during a random access procedure. The verification means that UE 700 is a real object within coverage of the base station 2000 and it is located within the range ring of the size of 1 TA value, which is 78 m for LTE and 500 m for GSM. If the TOA-based distance measurement Da meets the following criterion [4], it means that the TOA-based positioning is correct:

$$TA_{n-1} \leq Da \leq TA_{n+1} \quad [4]$$

An additional justification may be that if any part of the base station reference data were incorrect, which may include antenna site coordinates and $T_0$ of any participating base station, the measured UE (X, Y, H) TOA-based position will be incorrect with respect to TA value (and associated distance) from the given eNB, with which UE is in RRC_CONNECTED state. This is especially important as TOA Data, as shown in FIGS. 7, 12 and 14 may be delivered to the UE 700 via broadcast transmission, which is unidirectional, and in an RRC_IDLE state the UE may be not able to verify if it is correct. It should be also be mentioned that, once in the RRC_CONNECTED state, the received transmission from a given base station may be of better quality, as usually the connection has a higher transmission power. This may have an impact on multipath propagation. To compensate this effect, the UE position may be recalculated and the TOA-based distance measurement used for verification purposes may be also used for positioning. This may also improve positioning accuracy because the most current base station reference data may be used.

In some embodiments, the base station to which the UE 700 has established the RRC_CONNECTED state may not be involved in position calculations due to constellation geometry issues. In such a case, the received, additional TOA-based measurement can be used for position optimization.

As for justification of equation [4], it may be assumed that to exceed a tolerance of 78 m, a UE should be moving at a speed of at least 78 m/s, assuming an update frequency of 1 Hz. This equates to a speed of 280.8 km/h, which is much greater than the typical speed of drones or ground vehicles. In case of higher speeds, the tolerance may, however, may be increased to 2 TA units, in case of LTE (156 m) for verification purposes.

Summarizing, by performing the verification process, the UE 700 may confirm that an obtained TOA-based UE (X, Y, H) position is within a given tolerance, which also means that TOA data provided by contributing base stations are of good quality. This in turns provide a technical verification of the UE's position, which relies on bidirectional active signal exchanges, which may be considered equivalent to secondary radar interrogations and positioning.

UE self-verification may be also essential in case when the UE 700 is performing a self-separation service against nearby traffic.

In another operation 1314, the UE 700 may report its UE (X, Y, H) TOA-based position to the base station with which the UE is in the RRC_CONNECTED state. The TOA-based position is sent in a UE positioning report 1285. The UE positioning report 1285 may comprise, for example:

UE ID/Flight ID,
UE (X, Y, H) TOA-based position,
Base station IDs (REF1, REF2, REF3),
$D_{aue}$ value,
$TA_{aenbue}$ last value.

The UE ID/Flight ID may be related to a user ID or handset ID under which the UE 700 is tracked within the particular mobile network. A dedicated Flight ID may be allocated or assigned to a given airborne vehicle. Applicability of such unique UE ID/Flight ID is typical for air traffic control applications. Flight ID may be associated with a flight plan. The UE (X, Y, H) TOA-based position is the UE position derived from TOA measurements according to the above method.

The base station IDs (REF1, REF2, REF3) may be used for verification at the UE 700. The mobile network may use the base station IDs and associate this information with base station coordinates from an internal database. Thus, in case of any wrong or false ID data related to mobile network components provided in a positioning report 1285, which may indicate a false or altered radio transmission, such errors may be identified during the verification process. Additionally, positioning error and measurement accuracy may be independently verified and confirmed, if needed, as the constellation geometry will be known. As example embodiments involve a minimum of three base stations for TOA-based positioning, three base station IDs should typically be included in the report.

The $D_{aue}$ value denotes a TOA-based distance UE—base station A (in the RRC_CONNECTED state) used by the UE 700 for internal UE (X, Y, H) position verification. The presence of this data may be used also for additional verification and as a unique identifier or marker for authentication. As this value may be dynamically changed, it may be difficult to simulate or emulate it in a false of spoofed transmission. The $D_{aue}$ value is not provided if the base station does not support the TOA positioning method.

The TA$_{aenbue}$ last value is the TA correction provided by base station A (in the RRC_CONNECTED state) used by the UE 700 for internal UE (X, Y, H) position verification. The presence of this data may be used also for additional verification and as a unique identifier or marker for authentication. As this value may be dynamically changed, it may be difficult to simulate or emulate it in a false of spoofed transmission. If the base station to which the UE 700 is in the RRC_CONNECTED state does not support the TOA-based positioning method, the TA value may be used for verification as the mobile network may have information about base station coordinates and may determine a distance (or range ring) corresponding to the TA value provided in positioning report. The UE 700, without information about T$_0$, may not be able to use the TA value for internal position verification. The last (most accurate) TA value should be provided.

The UE 700 may also include in the positioning report 1285 additional data such as a height value determined by internal equipment, a flight plan, a heading, speed and/or other data which may be required by the end user system 740, such as for example an air traffic management system.

At the base station which receives the positioning report 1285 and supports the TOA positioning method, the positioning report is forwarded to the positioning system 730 with base station-related data which may be used for further verification, namely:
Base station ID (X, Y, H),
Base station ID,
TA$_{aue}$ last value,
RRC Connection Status (UE ID).

The base station ID (X, Y, H) may be used for base station confirmation, which may be important when the base station is mobile. The base station ID indicates which base station is providing the positioning report 1285. TA$_{aue}$ last value may be the same TA value as TA$_{aenbue}$ last value included in the UE positioning report 1285. The significant difference is this value's origin. TA$_{aenbue}$ last value is provided by the UE 700 in a radio transmission according to a given wireless standard, whereas the TA$_{aue}$ last value may be derived directly from base station logic, which means that this value cannot be accessible by outside observers, e.g. by eavesdropping, unless they have access to the internal workings of the mobile network. In practice it means that both TA values should be the same, or the difference between them should not be higher than 1 TA value when UE or base station mobility is considered.

The RRC Connection Status (UE ID) may be used as confirmation that the given UE 700 is in fact in the RRC_CONNECTED state with the given base station, which may be used as additional protection and also as a technical verification that the UE is associated with a real UE. If the given base station cannot confirm that it serves the given UE 700 for which a corresponding positioning report was sent by said base station, it may mean that the positioning report is false. An example may be a VPN transmission.

If a base station with which the UE 700 is in the RRC_CONNECTED state does not support TOA positioning, no further data is added to the UE positioning report 1285. At the UE positioning logic 1240, a second independent verification of the UE (X, Y, H) TOA-based position may be performed to provide positioning data applicable for operational purposes.

Figure 21A:
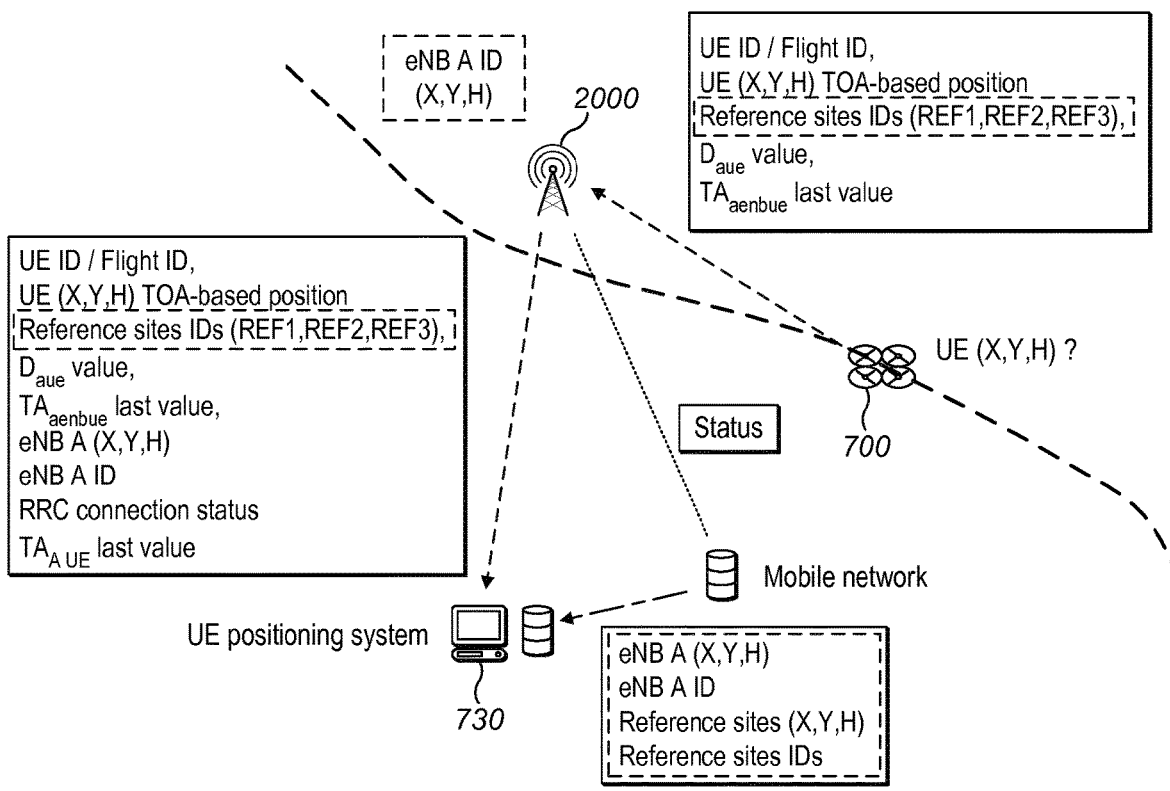
FIG. 21A-C are schematic top-plan views of a system for verifying position of the target according to some example embodiments.
Figure 21B:
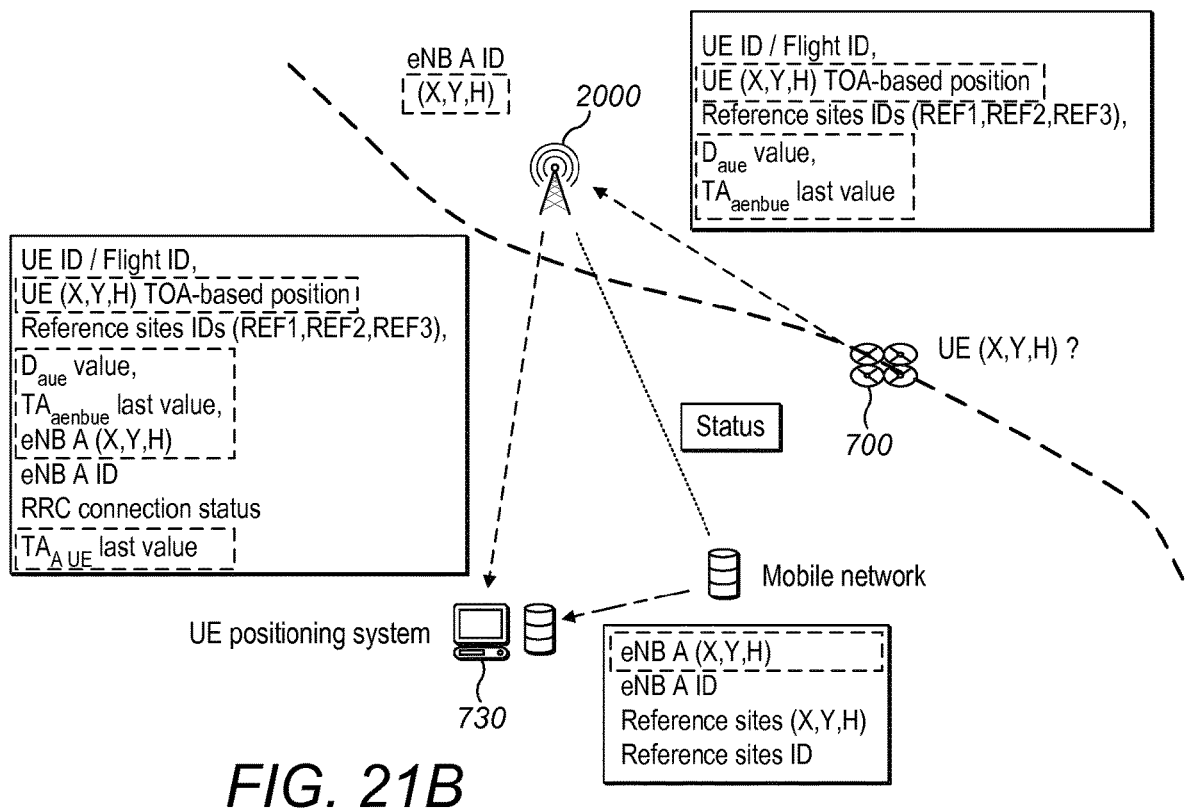
Figure 21C:
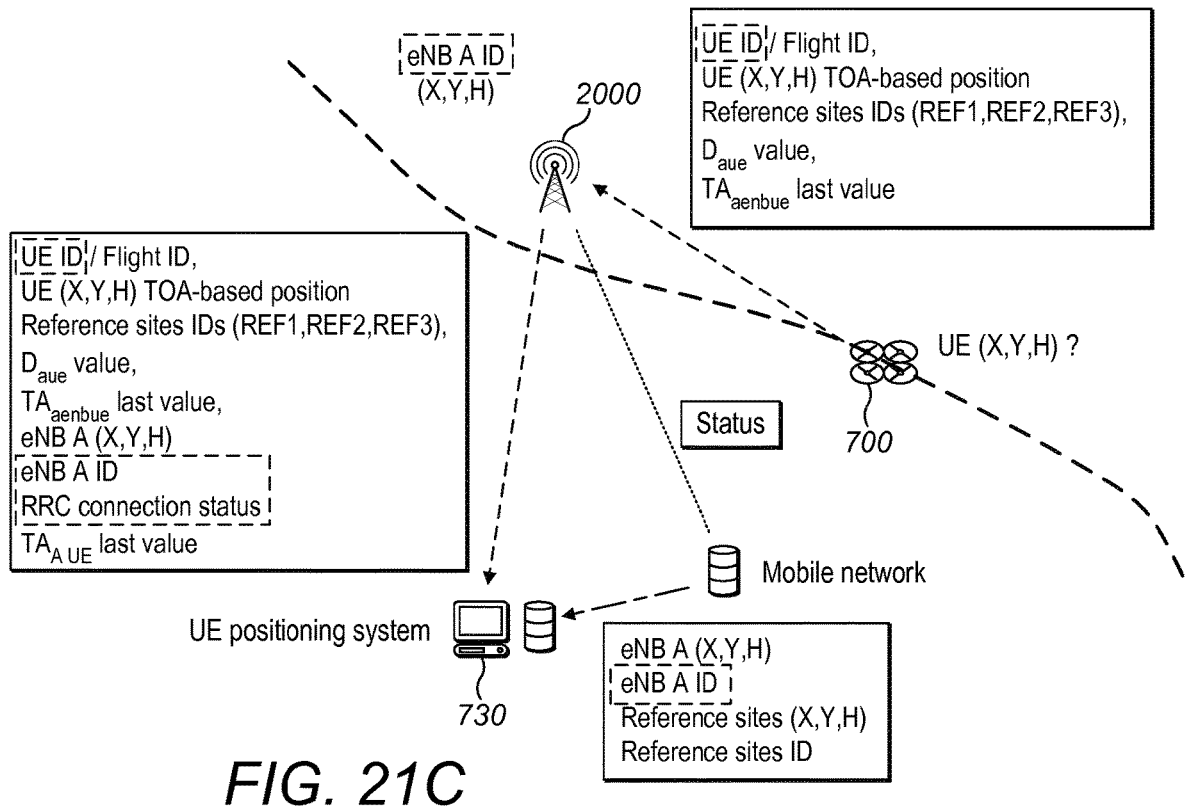

FIGS. 21A-21C are useful for understanding the above-mentioned verification steps. In this case, a typical airborne drone (equivalent to the UE 700 mentioned previously) follows a certain path. Data elements surrounded by dashed lines may indicate those elements that are used in each stage, according to some example embodiments.

Referring to FIG. 21A, at a given time, the drone, or UE 700 as it will be referred to for consistency, may measure its own position, switch to the RRC_CONNECTED state, and perform internal position verification for reporting in a positioning report to the positioning system 730 via the base station "A" 2000. The base station "A" 2000 is assumed to support TOA-based positioning. The base station "A" 2000 independently adds to the positioning report additional data, such as its own verification data, and may deliver this updated positioning report to the positioning system 730. The positioning system 730 may continuously receive related data, including statuses of connected base stations. The UE positioning system verification logic 1280 may perform a security check to verify whether received the UE (X, Y, H) position provided in the UE positioning report 1285 was measured based on authorized and real base stations.

The UE 700 provides in the UE positioning report 1285 the base station IDs for all base stations used for TOA-based positioning.

This data may be provided by a radio channel, and hence there is a risk that such a transmission will be intercepted, altered or replayed as fake flight data. In some cases, the provided data may be transmitted as the position of other UEs. The UE positioning to system verification logic 1280 is able to determine whether the received UE positioning report 1285 is or is not a fake and/or is or is not altered. The UE positioning system verification logic 1280 may compare whether the data reported as the base station IDs corresponds to the IDs of real base station IDs of the mobile network, which is or are currently in an operational status. Additionally, the base station "A" 2000 which provides the UE positioning report 1285 may be verified by its base station "A" ID and its position. Verification of the base station "A" 2000 coordinates may be essential in case of mobile base stations. As illustrated, there may be different signalling paths over which the TOA reference data may be sent to the UE positioning system 730.

Where example embodiments relate to real-time processing, any detected discrepancy at this verification step may indicate that the provided UE positioning report 1285 cannot be trusted in an operational application.

Referring now to FIG. 21B, the UE positioning system logic verifies whether the UE (X, Y, H) position in the positioning report 1285 and the TOA-based distance D$_{aue}$ to the base station "A" 2000 match the TA value TA$_{aue}$ provided by the base station "A", which is located at coordinates eNB A (X, Y, H). If the UE 700 is a real UE and there is no problem with accuracy of the TOA data provided by the base stations, the value of D$_{aue}$ should match the TA$_{aue}$ value with a given accuracy/tolerance, which may be typical for the wireless technology used (e.g. GSM/LTE/5G). If an error is found, and it is higher than the allowable tolerance, it may mean that UE positioning report 1285 was altered or is a fake, or that the TOA-based measurement accuracy provided by the mobile network is not sufficient for an operational application. Additionally, the UE positioning system logic may verify whether the TA$_{aue}$, provided by the base station "A" 2000 as a last value, matches the TA$_{aenbue}$ value reported by the UE 700. In one case, taking into account corner cases, this should be the same value, or the difference should not be higher than 1 TA step (or 2 TA for high speed UEs). This criterion may provide solid confirmation that the UE 700 is a real UE if such conditions are met. If the difference is higher than the allowed limit, this may indicate that the provided UE positioning report 1285 is a fake or was altered and cannot be used operationally. In this step, the base station "A" 2000 may itself be verified to identify whether its position or coordinates are the same as those specified in the mobile network database 1260, which may be also helpful in case of base station mobility and TOA data integrity.

FIG. 21C illustrates a verification criterion. The positioning system logic may check whether the indicated UE 700 is in fact served by the base station "A" 2000 by analysing the RRC_CONNECTED state of this UE reported by the base station "A". This verification may also include checking the status of the base station "A" 2000. This verification step may technically confirm an active bidirectional connection with the given UE 700, which may be useful for operational applicability. Without this step, the UE positioning system verification logic 1280 may not be able to confirm the source of UE positioning report 1285, and, without such information there is a risk that UE positioning report is false.

As indicated, the RRC_CONNECTED state verification based on the UE ID, which is unique ID for the mobile network, may change due to UE mobility. However, the mobile network should be able to confirm such identity.

As indicated in the UE positioning report 1285, the Flight ID cannot be used for verification at this step, as it may be user provided. The Flight ID may be used as additional criterion if a correlation with a flight plan is needed.

Summarizing, the example criteria indicated above, described with reference to FIGS. 21A-21C, provide a unique technical verification means which may be used to confirm operational applicability of the provided UE positioning report 1285.

Referring to the timing diagram of FIG. 14, phase #3 is represented by operations 1416-1418. Operation 1416 may comprise receiving a random access response from a base station, which may be responsive to the UE 700 performing a random access procedure to any base station. Operations 1417 and 1418 are appropriate for the case of ToA supported base stations. Operation 1417 comprises calculating the ToA distance to one of the base stations. Operation 1418 comprises performing position verification.

Verification of GNSS Position

The above described systems and methods may be used as a means for independent GNSS (e.g. GPS)-based UE position verification. As indicated, in some cases, a GNSS position may not be provided with adequate accuracy (for example, as a result of signal shadowing, lack of coverage or satellite visibility, spoofing, interference). By performing TOA-based positioning, or at least a TOA-based distance measurement, in accordance with example embodiments described above, the UE 700 may be able to determine whether positional data derived from GNSS signals is correct or within tolerances.

Figure 22A:
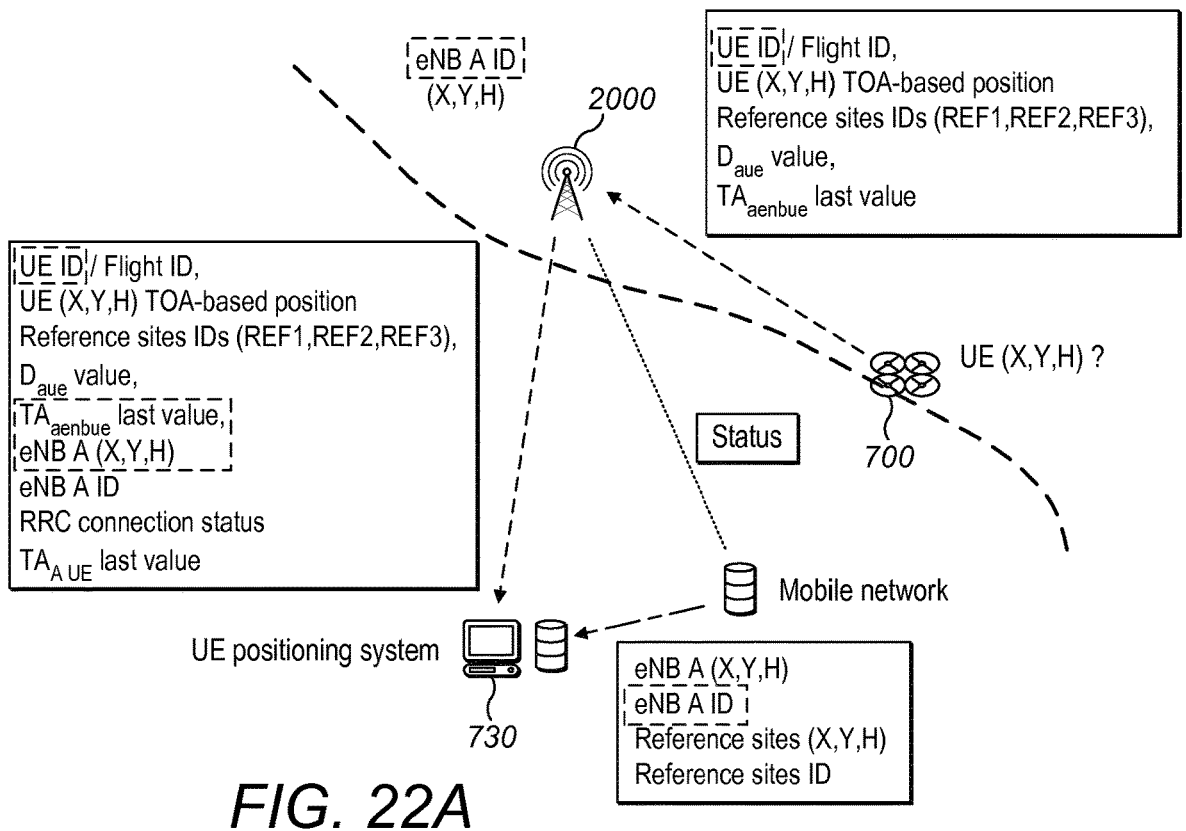
FIG. 22A-B are schematic top-plan views of a system for cross-checking and position verification against satellite-based positioning, according to some example embodiments.
Figure 22B:
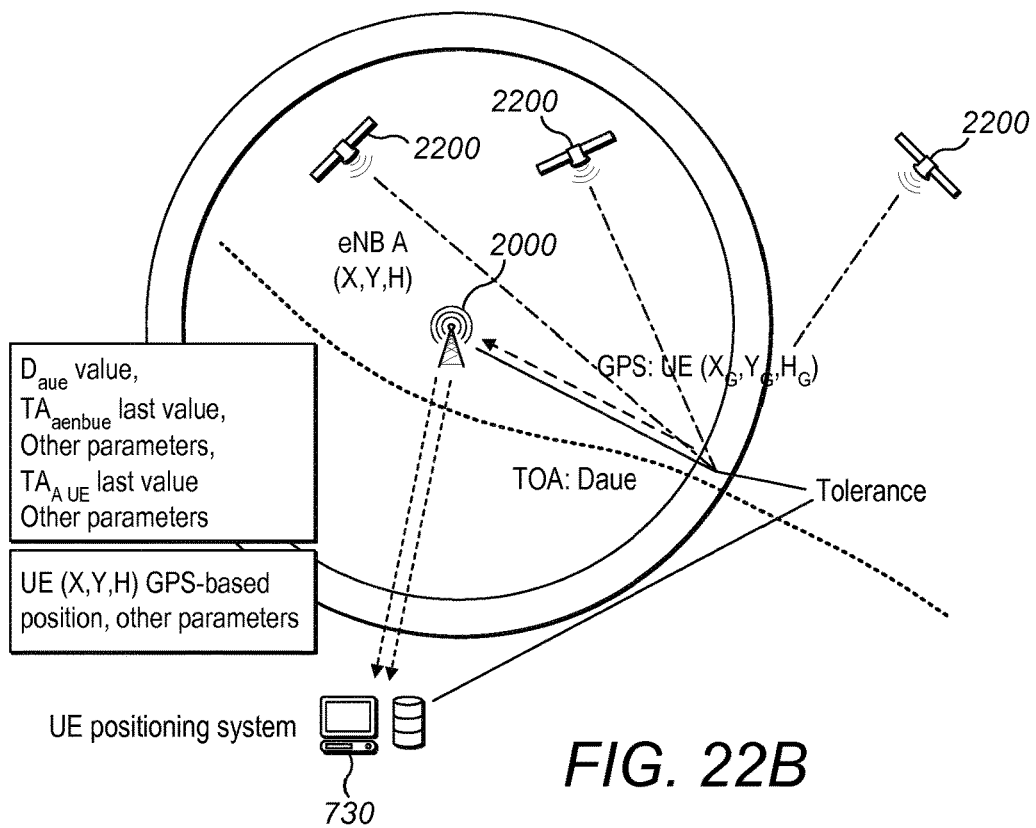

FIG. 22A illustrates a comparison of two independent sets of positional data, whereas FIG. 22B shows the scenario where the TOA distance UE 700→base station 2000 is used for GNSS position verification.

It should be noted that, in some cases, the TA value may be used as a verification means, although because the TA value is related to an established wireless connection, multipath propagation may have an impact on the quality of confirmation. Also, the base station (X, Y, H) coordinates must be also known by the UE 700 to measure a reference distance.

The same kind of verification operations may be applied in opposite direction, where TOA-based UE position accuracy is measured with respect to satellite-based position, e.g. from GPS. Hence, TOA and satellite-based methods of positioning may be complementary to one other. In normal operations, where both methods may be available, one method may be selected as primary positioning solution whereas the other may be a hot-swappable backup method and used also as verification means with configurable updates and verification checking.

FIG. 22B illustrates the situation where a satellite-based position (e.g. GPS) denoted as GPS: UE (XG, YG, HG) may be compared with TOA-based position TOA: UE (XT, YT, HT). Both methods should provide similar outcomes, which may be expressed as a measurement error or difference factor. The UE 700 may compare both results and decide which should be used, or where a correction may be applied. The UE 700 may not have to switch to the RRC_CONNECTED state to perform such a position verification, and the UE may be in RRC_IDLE state.

It should be noted that GNSS and other satellite-based positioning systems are based on broadcast transmissions, i.e. unidirectional communication. The UE 700 may be not able to confirm the satellite positions, but may need to relay on the provided data. In some situations, this may be used to deceive the UE 700, which is provided with a false or altered satellite-based reference signal and may take incorrect actions. An example of such a situation may be signal spoofing and/or forcing autonomous vehicles (drones) to change route.

The benefit of the TOA method is that the UE 700 may switch relatively easy to the RRC_CONNECTED state, and by acquiring the $TA_{aenbue}$ value during bidirectional communication, and based on the TOA-based distance $D_{aue}$ measurement, can confirm whether measured the TOA-based UE (X, Y, H) position matches a provided reference distance. This may be also applied for GPS-based position. It means that, if for any reason a satellite-based position is inaccurate, the situation may be reported or the UE 700 may be made aware that the obtained position cannot be trusted. In the case of an RRC_CONNECTED state, the UE 700 should be within defined TA range ring. This means that with this criterion (RRC_CONNECTED), even if less accurate, is more reliable than satellite-based positioning, even if high-accuracy positioning is possible.

A typical application of proposed solution may be related to autonomous drone (UAV) flight plan monitoring.

In some embodiments, the reference data may be received using different communications standards, such as GSM, LTE, 5G, NTN, to determine the initial position based on ToA principles. UEs may therefore utilise signals without necessarily waiting for data using the same given standard.

SUMMARY

Example embodiments relate to systems and methods that may be applied for TOA-based UE (X, Y, H) positioning especially when the UE 700 is in motion and when operational applications may be required, such as flight plan monitoring. As indicated, due to geometry issues, a proper selection of base stations may help minimize ambiguity errors. In the case of operational applications, where the same group of base stations may be used for providing position information of nearby UEs, positioning errors may be minimized in calculations because the same error distribution may be applied. Furthermore, when the UE 700 is in motion, additional improvements may be proposed in terms of minimizing position ambiguity. Further, technical verification criteria may be provided to confirm the quality of the position measurement and minimization of false UE reporting.

Figure 23:
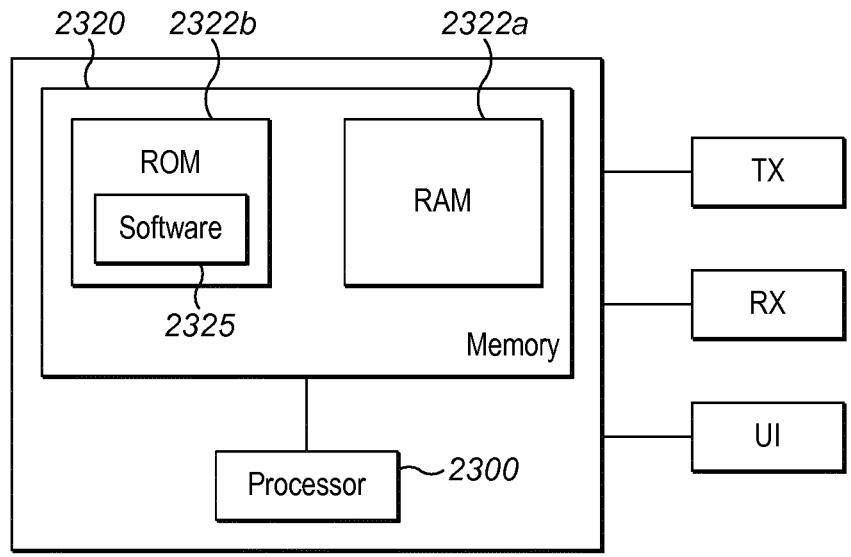
FIG. 23 is a block diagram of an apparatus according to some example embodiments.

FIG. 23 shows an example apparatus that may provide any one or more of the UE 700, the UE positioning system 730 or a base station.

The apparatus comprises at least one processor 2300 and at least one memory 2320 directly or closely connected or coupled to the processor 2300. The memory 2320 may comprise at least one random access memory (RAM) 2322*a* and at least one read-only memory (ROM) 2322*b*. Computer program code (software) 2325 may be stored in the ROM 2322*b*. The apparatus may be connected to a transmitter path and a receiver path in order to obtain respective signals comprising the aforementioned data. The apparatus may be connected with a user interface (UI) for instructing the apparatus and/or for outputting data. The at least one processor 2300 with the at least one memory 2320 and the computer program code may be arranged to cause the apparatus to at least perform methods described herein.

The processor 2300 may be a microprocessor, plural microprocessors, a control, or plural microcontrollers.

The memory 2320 may take any suitable form.

The transmitter path and receiver path may be established using a transceiver module which may be arranged suitable for any form of radio communications, for example cellular radio communications according to 3G/LTE/5G or future-generation standards.

Figure 24:
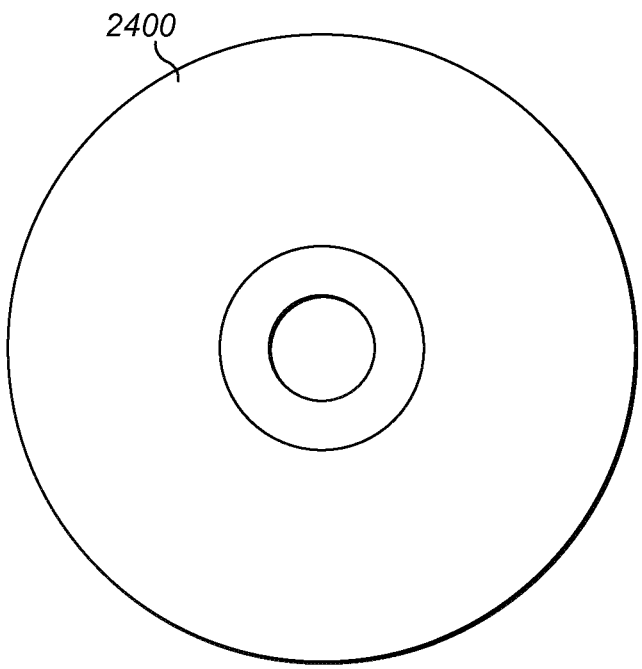
FIG. 24 shows a non-volatile media according to some example embodiments.

FIG. 24 shows a non-transitory media 2400 according to some embodiments. The non-transitory media 2400 is a computer readable storage medium. It may be e.g. a CD, a DVD, a USB stick, a blue ray disk, etc. The non-transitory media 2400 stores computer program code causing an apparatus to perform operations described above when executed by a processor such as processor 2300 of FIG. 23.

It is to be understood that what is described above is what is presently considered the preferred embodiments. However, it should be noted that the description of the preferred embodiments is given by way of example only and that various modifications may be made without departing from the scope as defined by the appended claims.

The invention claimed is:

1. Apparatus, comprising circuitry configured for:
    receiving, for respective ones of a plurality of remote base stations, reference data usable for estimating a geographic position of the apparatus based on its distance from two or more of the plurality of remote base stations;
    within a predetermined update period, receiving updated reference data for at least one of the plurality of remote base stations;
    at an end of the predetermined update period, identifying at least two base stations of the plurality of remote base stations meeting at least one predetermined first criteria and determining an initial geographic position of the apparatus using data, wherein the used data comprises data of at least one of:
        the received reference data, or
        the updated reference data,
    wherein the used data is associated with the at least two base stations;
    establishing a bidirectional communications link with one or more of the plurality of remote base stations from which the reference data is received; and
    receiving verification data via the bidirectional communications link, wherein the verification data is usable to verify accuracy of the initial geographic position, or another geographic position derived therefrom.

2. The apparatus of claim 1, wherein the received reference data is received from the respective ones of the plurality of remote base stations and comprises time of arrival reference data including an indication of a geographic position and a transmission time of a reference signal or data, the circuitry further being configured for:
    receiving, from the respective ones of the plurality of remote base stations, one or more reception times of the time of arrival reference data;
    storing the time of arrival reference data and the one or more reception times for the respective ones of the plurality of remote base stations in a database;
    within the predetermined update period, receiving for the at least one of the plurality of remote base stations, further time of arrival reference data and/or one or more further reception times;
    updating the database using the further time of arrival reference data and/or the one or more further reception times for the at least one of the plurality of remote base stations; and
    at the end of the predetermined update period, determining the initial geographic position of the apparatus based on the received geographic positions and a delay between the transmission time, the one or more reception times of the reference signal or the data stored in the database, and the further time of arrival reference data and/or the one or more further reception times.

3. The apparatus of claim 2, wherein the circuitry is configured for:
    detecting reception of a plurality of reception times for the at least one of the plurality of remote base stations within the predetermined update period, and
    selecting only one of said plurality of reception times to use in the database for the initial geographic position determination.

4. The apparatus of claim 3, wherein the circuitry is configured for selecting a minimum reception time to use in the database for the initial geographic position determination.

5. The apparatus of claim 1, wherein the circuitry is further configured for updating the initial geographic position, comprising
    identifying at least one pair of base stations of the plurality of remote base stations meeting a predetermined first criterion or criteria, based at least on their respective positions with respect to at least the initial geographic position, and
    using the reference data of the at least one identified pair of base stations in the database to provide an updated geographic position.

6. The apparatus of claim 5, wherein the circuitry is configured for identifying the at least one pair of base stations based on an angle between vectors extending from the initial geographic position to respective positions of the at least one pair of base stations.

7. The apparatus of claim 6, wherein the circuitry is configured for identifying the at least one pair of base stations having the angle between the vectors that is closest to 90 degrees.

8. The apparatus of claim 6, wherein the circuitry is configured for identifying a plurality of base stations pairs, of the plurality of remote base stations, respectively having an angle between the vectors that is within a predetermined allowable region, either side of 90 degrees.

9. The apparatus of claim 8, wherein the allowable region is substantially between 60 and 120 degrees.

10. The apparatus of claim 5, wherein the apparatus further comprises circuitry configured for determining the geographic position based on received satellite signals, and wherein the circuitry is further configured for comparing a position determined with the satellite signals with one or more positioning determinations to determine if they substantially match.

11. The apparatus of claim 1, wherein the verification data comprises a timing advance signal received as part of a radio resource control synchronisation process.

12. The apparatus of claim 1, wherein the circuitry is configured for establishing the bidirectional communications link with at least one of the plurality of remote base stations from which reference data is received using a global system for communications-railway communications standard.

13. The apparatus of claim 1, wherein one or more of the plurality of remote base stations are satellites comprising part of a non terrestrial network.

14. The apparatus of claim 1, wherein the initial geographic position is determined based on simultaneous usage of reference data received using different communications standards.

15. The apparatus of claim 1, wherein positions of the respective ones of the plurality of remote base stations comprise a position of one or more antennas on or associated with the respective ones of the plurality of remote base stations.

16. The apparatus of claim 15, wherein the circuitry is configured for receiving the positions of the respective ones of the plurality of remote base stations in a radio frame or sub-frame or commonly agreed reference symbol of repetitive nature.

17. The apparatus of claim 16, wherein the radio frame or sub-frame is one of a LTE, 5G or subsequent-generation radio frame.

18. The apparatus of claim 1, wherein the circuitry is configured for receiving the reference data, the updated reference data, and/or the verification data in a system information block.

19. A method, comprising:
  receiving, for respective ones of a plurality of remote base stations, reference data usable for estimating a geographic position of the apparatus based on its distance from two or more of the plurality of remote base stations;
  within a predetermined update period, receiving updated reference data for at least one of the plurality of remote base stations;
  at an end of the predetermined update period, identifying at least two base stations of the plurality of remote base stations meeting at least one predetermined first criteria and determining an initial geographic position of the apparatus using data, wherein the used data comprises data of at least one of:
    the received reference data, or
    the updated reference data,
  wherein the used data is associated with the at least two base stations;
  establishing a bidirectional communications link with one or more of the plurality of remote base stations from which the reference data is received; and
  receiving verification data via the bidirectional communications link, wherein the verification data is usable to verify accuracy of the initial geographic position or another geographic position derived therefrom.

20. A non-transitory computer-readable medium comprising program instructions stored thereon for performing the method of claim 19.

* * * * *

UNITED STATES PATENT AND TRADEMARK OFFICE
CERTIFICATE OF CORRECTION

| | | |
|---|---|---|
| PATENT NO. | : 11,812,337 B2 | Page 1 of 1 |
| APPLICATION NO. | : 17/254370 | |
| DATED | : November 7, 2023 | |
| INVENTOR(S) | : Fabian Wiacek | |

It is certified that error appears in the above-identified patent and that said Letters Patent is hereby corrected as shown below:

On the Title Page

Item (30) Foreign Application Priority Data:
Please insert --June 25, 2018 PCT/EP2018/066939--.

Signed and Sealed this
Twenty-third Day of April, 2024

Katherine Kelly Vidal
*Director of the United States Patent and Trademark Office*